(12) United States Patent
Saito et al.

(10) Patent No.: US 7,656,452 B2
(45) Date of Patent: Feb. 2, 2010

(54) IMAGING DEVICE, PORTABLE TERMINAL USING THE SAME, AND IMAGE DEVICE PRODUCING METHOD

(75) Inventors: Masashi Saito, Koganei (JP); Mutsumi Sugiura, Tachikawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 481 days.

(21) Appl. No.: 10/562,530

(22) PCT Filed: Jul. 5, 2004

(86) PCT No.: PCT/JP2004/009886

§ 371 (c)(1),
(2), (4) Date: Dec. 27, 2005

(87) PCT Pub. No.: WO2005/003835

PCT Pub. Date: Jan. 13, 2005

(65) Prior Publication Data

US 2006/0146170 A1    Jul. 6, 2006

(30) Foreign Application Priority Data

| Jul. 8, 2003 | (JP) | ............... | 2003-193509 |
| Oct. 7, 2003 | (JP) | ............... | 2003-348034 |
| Oct. 8, 2003 | (JP) | ............... | 2003-349192 |
| Oct. 8, 2003 | (JP) | ............... | 2003-349193 |

(51) Int. Cl.
*H04N 5/225* (2006.01)

(52) U.S. Cl. .................................... 348/340; 348/373

(58) Field of Classification Search ................. 348/340, 348/207.99, 208, 373–376; 250/208.1; 396/76
See application file for complete search history.

(56) References Cited

U.S. PATENT DOCUMENTS

| 5,783,815 A * | 7/1998 | Ikeda ....................... 250/208.1 |
| 2003/0056967 A1* | 3/2003 | Glenn et al. ................ 174/52.4 |
| 2004/0061799 A1* | 4/2004 | Atarashi et al. ............. 348/340 |

FOREIGN PATENT DOCUMENTS

| EP | 1223749 A1 * | 7/2002 |
| JP | 146101/1987 | 9/1987 |
| JP | 7-134236 A | 5/1995 |
| JP | 7-231443 A | 8/1995 |
| JP | 8-9695 Y2 | 3/1996 |

(Continued)

*Primary Examiner*—Jason Chan
*Assistant Examiner*—Joel Fosselman
(74) *Attorney, Agent, or Firm*—Cohen Pontani Lieberman & Pavane LLP

(57) ABSTRACT

This invention relates to dust-proof, moisture-proof structures of the image pickup devices mounted in small-size thin types of electronic apparatus. More specifically, an image pickup device of this invention includes an image pickup element, a mounting base having a formed leg section which abuts on the image pickup element, an image pickup optical system that guides photographic object light to the imaging region of the image pickup element, and an outer frame member that contains the image pickup element, the mounting base, and the image pickup optical system. The space formed at the photoelectric conversion plane side of the image pickup element is sealed by using the mounting base or by using the mounting base and a part of the outer frame member.

8 Claims, 20 Drawing Sheets

FOREIGN PATENT DOCUMENTS

| | | |
|---|---|---|
| JP | 9-130683 A | 5/1997 |
| JP | 2000-49319 | 2/2000 |
| JP | 2002-118776 | 4/2002 |
| JP | 2003-5017 A | 1/2003 |
| JP | 2003-37758 A | 2/2003 |
| JP | 2003-43333 A | 2/2003 |

\* cited by examiner

IMAGING DEVICE, PORTABLE TERMINAL USING THE SAME, AND IMAGE DEVICE PRODUCING METHOD

RELATED APPLICATIONS

This is a U.S. National Phase Application under 35 U.S.C. 371 of International Application PCT/JP2004/009886, filed on Jul. 5, 2004.

This application claims the priority of Japanese Application Nos. 2003-193509 filed Jul. 8, 2008, 2003-348034 filed Oct. 7, 2003, 2003-349192 filed Oct. 8, 2003 and 2003-349193 filed Oct. 8, 2003, the entire content of all of which is hereby incorporated by reference.

FIELD OF THE INVENTION

The present invention relates to image pickup devices, and more particularly to a compact and thin type of image pickup device built into a hand-held terminal, to an image pickup device capable of macro-photographing, and to a method of manufacturing these image pickup devices.

BACKGROUND OF THE INVENTION

Compact and thin types of image pickup devices are traditionally coming to be mounted in compact and thin types of electronic apparatus such as hand-held telephones and personal computers, and in PDAs (Personal Digital Assistants) and the like, to thereby enable transmission not only of voice information, but also of image information, to and from remote places.

The image pickup devices mounted in these hand-held terminals are very short in the focal length of an image pickup optical system and have aperture F-numbers as small as about 2 to 4. For these reasons, the focal depth at the image side is very small and stringent accuracy is required for positioning in the optical-axis direction of the image pickup optical system with respect to an image pickup plane. In addition, light-receiving sections for photoelectric conversion are arranged at pitches of several micrometers, and so if any dust particles blocking the flux of light incident on the object to be photographed are present on the microlens disposed on a light-receiving element, trouble will occur in object image data.

Solid-state image pickup elements such as a CCD (Charge-Coupled Device) type image sensor or CMOS (Complementary Metal-Oxide Semiconductor) type image sensor are used as the image pickup elements for the image pickup devices described above.

Position-setting methods and dust-proofing methods for the image pickup optical systems of the image pickup devices are proposed in connection with the above. Patent Reference 1, for instance, discloses information on a structure intended to obviate the necessity for focus adjustment during the manufacture of the image pickup device. This structure provided with dust-proofing and moisture-proofing is also adapted to position an image pickup device element and an optical member in the direction of an optical axis by abutting the legs formed integrally with the optical member, on the image pickup device element, and energize this optical member in the direction of the image pickup device.

Image pickup devices capable not only of pan-focus photographing that uses a great depth-of-field with an image pickup optical system fixed, but also of macro-photographing with the image pickup optical system moved, in order to achieve more strengthened functionality, have become available on the market in recent years.

For example, Patent Reference 2 discloses, as an example of an image pickup device capable of macro-photographing, a device that has protrusions and inclined cam grooves formed at alternate positions on an image pickup lens and a tubular holder, moves the image pickup lens in an optical-axis direction by pivoting the image pickup lens, adjusts focus during assembly, and thus enables close-up photographing that uses the inclined grooves.

However, since the above-mentioned solid-state image pickup elements, when used intact, have a spectral sensitivity ranging up to an infrared light region, the infrared light region is cut off before photographic object light reaches the image pickup element.

In connection with the cutoff of the infrared light, some image pickup elements have an infrared light cutoff filter in front of an image pickup lens, as described in Patent Reference 3, for example.

[Patent Reference 1] Japanese Laid-Open Patent Application Publication No. 2003-37758

[Patent Reference 2] Japanese Laid-Open Patent Application Publication No. 2002-82271

[Patent Reference 3] Japanese Laid-Open Patent Application Publication No. 2002-341218

A first problem that the present invention is to solve includes the following.

That is to say, the image pickup devices mounted in the foregoing hand-held terminals are also required to provide higher image quality in response to an increase in the proliferation ratio of these devices, and there are requests for image pickup devices having an image pickup element larger in the number of pixels.

Increasing the number of pixels in image pickup devices intended to obtain higher image quality, however, reduces pixel pitches and correspondingly lessens the maximum permissible size of the dust sticking to the photoelectric conversion plane of the image pickup device. Therefore, current situations are already posing the problem that even if there is any sticking dust that is too small to be visible with naked eyes, image data cannot be obtained since a photographic object light flux is blocked.

In this respect, using the image pickup device described in above Patent Reference 1 is a simple and convenient method not requiring an adjustment process for positioning the image pickup element and the optical member in the direction of the optical axis, and is also a method effective for preventing entry of dust from outside. In this method, however, if microvibration or the like is applied to the device interior for a long time, dust arises from wear due to contact between the legs of the optical member and the isolation wall of a mirror housing/frame or from wear from the abutting sections between the legs and the image pickup element. If the dust sticks to the upper face of the image pickup element, the drawback may occur that since a photographic object light flux is blocked, object image data is affected.

Also, during the zooming or close-up photographing that involves moving an image pickup optical system, mechanical linking to the operating member and driving member for moving the image pickup optical system is required, which permits outside dust to enter from the linking sections and causes a drawback similar to the above.

A second problem that the present invention is to solve includes the following.

That is, image pickup devices for mounting in hand-held terminals are required to be as thick as possible in response to reduction in the thickness of the apparatus in which the image pickup device is to be mounted, and this requirement is difficult to meet by using a conventional ceramic package or resin-molded package. Accordingly, dimensional reduction that includes thinning-down is generally accomplished by, after a semiconductor image sensor chip in which is formed a microlens array functioning as an image pickup element has been mounted intact on the printed circuit board forming the image pickup device, assembling optical system constituent elements and the like and integrating these constituent elements into a single unit.

In addition, these hand-held terminals are carried by users and used under various environmental conditions. In particular, if the image pickup element is exposed to a high-humidity atmosphere for a long time, reliability will decrease since the surface of the image pickup element will corrode or the microlens will be adversely affected.

The image pickup device described in Patent Reference 2, however, has protrusions on the surface of an image pickup lens, and inclined dam grooves in a tubular holder, and pivots the image pickup lens by pivoting the aperture-stop-fitted retainer disposed at the front edge of the image pickup device, and moves the lens in its optical-axis direction along the inclined grooves. Using this construction permits moisture to readily enter from the clearances between protrusion-free sections on the circumference of the image pickup lens and the inside of the tubular holder, thus adversely affecting the image pickup element.

There is also the problem that when the cam grooves or the cam surface is used to move the image pickup optical system along the cam, foreign matter sticking to the cam surface causes trouble with the operation of the image pickup optical system and/or tilts the optical axis of the image pickup optical system.

In addition, these image pickup devices for mounting in hand-held terminals are required to be as thick as possible in response to reduction in the thickness of the apparatus in which the image pickup device is to be mounted.

In terms of this tendency, for the image pickup device described in Patent Reference 2, information on a method of cutting off infrared light is not disclosed and it is unclear how the infrared light is cut off.

For the image pickup device described in Patent Reference 3, because of an infrared light cutoff filter being disposed in front of the image pickup lens, there is the problem that since not only the thickness of the image pickup lens but also that of the infrared light cutoff filter is added as the overall length of the image pickup device, this device increases in overall length, that is, in thickness.

Furthermore, such an image pickup device is very small (1 cm$^3$ or less in volume), requires very delicate handling during manual assembly by an operator, and has been high in assembly cost. Manual assembly also makes it difficult to rapidly respond to a change in demand. For these reasons, it is considered necessary to automate assembly for a reduced cost and for flexible response to the change in demand.

For the image pickup device described in Patent Reference 2, however, there is a need to form protrusions and inclined grooves at alternate positions on the image pickup lens and the tubular holder, match these protrusions and inclined grooves during assembly, and after that, rotate the image pickup lens to prevent it from coming off. Therefore, this device has the problem that it is not of a structure suitable for the automation of assembly.

DISCLOSURE OF THE INVENTION

A first object of the present invention is to obtain with the above problems in view: an image pickup device that can prevent the dust entering from outside and the dust occurring during internal operation, from sticking to an image pickup element, and thus protect image data from trouble; and a hand-held terminal having this image pickup device.

A second object of the present invention is to obtain: an image pickup device constructed so as to move an image pickup optical system along a cam, in which construction the image pickup device able to prevent foreign matter from sticking to the cam, to ensure accurate operation of the image pickup optical system, and thus to prevent entry of moisture into an image pickup element disposed inside the image pickup optical system, can make the image pickup optical system movable for macro-photographing; and a hand-held terminal having this image pickup device.

A third object of the present invention is to obtain with the above third problem in view: an image pickup device reduced in thickness, in spite of an image pickup optical system being movable for macro-photographing; and a hand-held terminal having this image pickup device.

A fourth object of the present invention is to obtain with the above first problem in view: an image pickup device that can be assembled in an automated fashion and is low in cost and flexibly responsive to changes in demand. The above first problem can be solved by constructing an image pickup device that includes an image pickup element, a mounting base on which is formed a leg section that abuts on the image pickup element, an image pickup optical system for guiding photographic object light to an image pickup region of the image pickup element, and an outer frame member that contains the image pickup element, the mounting base, and the image pickup optical system. In this device construction, a space formed at the photoelectric conversion plane side of the image pickup element is sealed by using the mounting base or by using the mounting base and a part of the outer frame member.

Also, in this image pickup device, a desired section present at a position different from the leg of the mounting base, and either a circuit board with the image pickup element mounted thereon, or the outer frame member are desirably bonded with the leg abutted on the image pickup element, to thereby seal the space at the photoelectric conversion plane side of the image pickup element.

In addition, in this image pickup device, the image pickup optical system is desirably formed with an abutting section which abuts on the mounting base, and energized towards the mounting base by an energizing member.

Furthermore, in this image pickup device, the mounting base desirably has a cam surface and pivots the image pickup optical system along the cam surface to thereby move the image pickup optical system along an optical axis.

Furthermore, in this image pickup device, it is desirable that the mounting base should have abutting horizontal surfaces formed with different heights, and that the image pickup optical system be internally mounted by selection of either of the horizontal surfaces.

Moreover, in this image pickup device, an imaging light flux transmitting section of the mounting base is desirably formed with a part of an optical member which forms the image pickup optical system.

Moreover, in this image pickup device, the mounting base is desirably formed with an infrared cutoff filter.

Besides, in this image pickup device, it is desirable that the image pickup optical system be constructed of plural optical members and that the optical members abut on one another.

Constructing a hand-held terminal having any one of the above image pickup devices makes it possible to obtain a hand-held terminal having an image pickup device which solves the foregoing first problem.

Also, the foregoing second problem is solved by the following:

1) An image pickup device including: an image pickup element that photoelectrically converts photographic object light; an image pickup optical system that guides the object light to a photoelectric conversion region of the image pickup element; a cam member having a cam surface which abuts on an abutting section formed on a section other than an optically effective face of the image pickup optical system; and a base member that holds the cam member. In the image pickup device of item (1), the cam member also has a stepped section lower than the cam surface and is bonded to the base member via an adhesive applied to the stepped section.

2) The image pickup device of item (1), wherein: the cam member is engaged with the base member, on an outer peripheral side face of the cam member; and a space at the image pickup element side is sealed with the adhesive.

3) The image pickup device of item (1) or (2), wherein: the cam surface is formed in a plurality of places on the cam member; and the stepped section is also formed in a region between the plurality of cam surfaces.

4) The image pickup device of any one of items (1) to (3), wherein: the cam member further has a leg section which abuts on the image pickup element, the leg section being bonded to the base member while in an abutting state with respect to the image pickup element; and the image pickup optical system is energized in a direction of the image pickup element by an energizing member to thereby abut on the cam surface(s) of the cam member, at the abutting section.

The foregoing fourth problem is solved by the following:

5) An image pickup device including: an image pickup element that photoelectrically converts photographic object light; an image pickup optical system that guides the object light to a photoelectric conversion region of the image pickup element; and a cam member having a cam surface which abuts on an abutting section formed on a section other than an optically effective face of the image pickup optical system. In the image pickup device of item (5), the cam member further has a light-transmitting section formed of a light-transmissive material, and the face of the light-transmitting section that exists at the same side as that at which the cam surface is formed is formed such that at least a peripheral section of the particular face is positioned in protruding form with respect to the cam surface; the above-mentioned face being coated to cutoff infrared light.

6) The image pickup device of item (5), wherein: the light-transmitting section is formed on the cam member in such a manner as to cover the photoelectric conversion side of the image pickup element; the cam member further has a leg section which abuts on the image pickup element, the leg section being fixed in such a state as to abut on the image pickup element; and the image pickup optical system is energized in a direction of the image pickup element by an energizing member to thereby abut on the cam surface of the cam member, at the abutting section.

7) The image pickup device of item (5) or (6), wherein the face coated to cut off infrared light is an object light incident face of the light-transmitting section, the coated face being a concave face.

The foregoing fourth problem is solved by the following:

8) An image pickup device including: a printed circuit board on which is mounted an image pickup element for photoelectrically converting photographic object light; an image pickup optical system that guides the object light to a photoelectric conversion region of the image pickup element; a cam member having a cam surface which abuts on an abutting section formed on a section other than an optically effective face of the image pickup optical system; a base member that holds the cam member; an outer frame member containing at least the image pickup optical system; and a pivoting member pivotally disposed on an outside face of the outer frame member, the pivoting member further including an integrally formed engagement section which engages with the image pickup optical system. The image pickup device of item (8) is constructed so that the base member, the cam member, the outer frame member, the image pickup optical system, and the pivoting member are rested and assembled on the printed circuit board from the same direction.

9) A method of manufacturing an image pickup device which includes: a printed circuit board on which is mounted an image pickup element for photoelectrically converting photographic object light; an image pickup optical system that guides the object light to a photoelectric conversion region of the image pickup element; a cam member having a cam surface which abuts on an abutting section formed on a section other than an optically effective face of the image pickup optical system, the cam member further having a leg section which abuts on the image pickup element; a base member that holds the cam member; an outer frame member containing at least the image pickup optical system; and a pivoting member pivotally disposed on an outside face of the outer frame member, the pivoting member further including an integrally formed engagement section which engages with the image pickup optical system. The image pickup device manufacturing method of item (9) includes the steps of: fixedly resting the base member at a required position on the printed circuit board; fixing the cam member to the base member by lowering the cam member thereinto with the leg section abutting on the image pickup element; fixing the base member to the outer frame member; mounting the image pickup optical system internally with respect to the outer frame member; and bringing the engagement section into engagement with the image pickup optical system by mounting the pivoting member on the outside face of the outer frame member.

10) An image pickup device including: a printed circuit board on which is mounted an image pickup element for photoelectrically converting photographic object light; an image pickup optical system that guides the object light to a photoelectric conversion region of the image pickup element; a cam member having a cam surface which abuts on an abutting section formed on a section other than an optically effective face of the image pickup optical system; a main barrel that contains at least the cam member and the image pickup optical system; and a pivoting member pivotally disposed on an outside face of the main barrel, the pivoting member further including an integrally formed engagement section which engages with the image pickup optical system. The image pickup device of item (10) is constructed so that the main barrel, the cam member, the image pickup optical system, and the pivoting member are rested and assembled on the printed circuit board from the same direction.

11) A method of manufacturing an image pickup device which includes: a printed circuit board on which is mounted an image pickup element for photoelectrically converting photographic object light; an image pickup optical system that guides the object light to a photoelectric conversion region of the image pickup element; a cam member having a cam surface which abuts on an abutting section formed on a section other than an optically effective face of the image pickup optical system, the cam member further having a leg section which abuts on the image pickup element; a main barrel that contains at least the cam member and the image pickup optical system; and a pivoting member pivotally disposed on an outside face of the outer frame member, the pivoting member further including an integrally formed engagement section which engages with the image pickup optical system. The image pickup device manufacturing method of item (11) includes the steps of: fixedly resting the main barrel at a required position on the printed circuit board; fixing the cam member to the main barrel by lowering the cam member thereinto with the leg section abutting on the image pickup element; mounting the image pickup optical system internally with respect to the main barrel; and bringing the engagement section into engagement with the image pickup optical system by mounting the pivoting member on the outside face of the main barrel.

12) A hand-held terminal having any one of the image pickup devices of items (1) to (11).

BEST MODE FOR CARRYING OUT THE INVENTION

While the following describes embodiments of the present invention in detail, the invention is not limited to the embodiments or by the description thereof.

Figure 1:
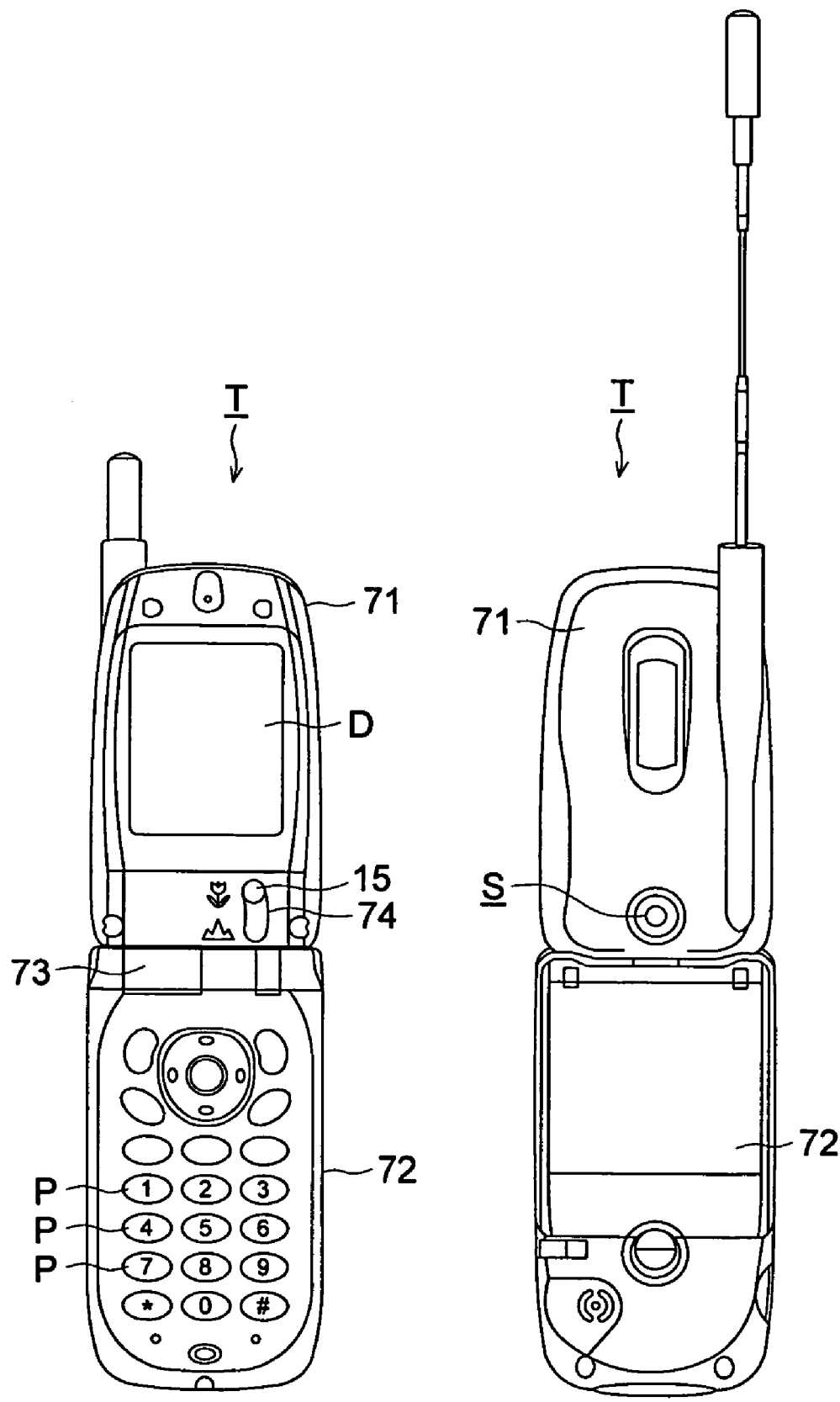
FIG. 1 is an external view of a hand-held telephone T, an example of a hand-held terminal containing an image pickup device of the present invention.

FIG. 1 is an external view of a hand-held telephone T, an example of a hand-held terminal containing an image pickup device of the present invention.

The hand-held telephone T shown in FIG. 1 has an upper case 71 and a lower case 72. The upper case 71 with a display screen D, and the lower case 72 with a set of operating buttons P are connected via a hinge. An image pickup device S is contained internally, below the display screen D within the upper case 71, and the image pickup device S is disposed so that the device S can acquire light from an outer surface of the upper case 71.

Below the display screen D of the upper case 71, a circular opening 74 is disposed with an operating member 15 exposed therefrom. Moving the operating member 15 upward within the opening 74 of FIG. 1 sets the image pickup device S to a focal position for macro-photographing.

This image pickup device may be disposed above the display screen D within the upper case 71 or on a side face of the display screen D. The same also applies to the operating member 15. In addition, the kind of hand-held telephone is, of course, not limited to a folding type.

First Embodiment

Figure 2:
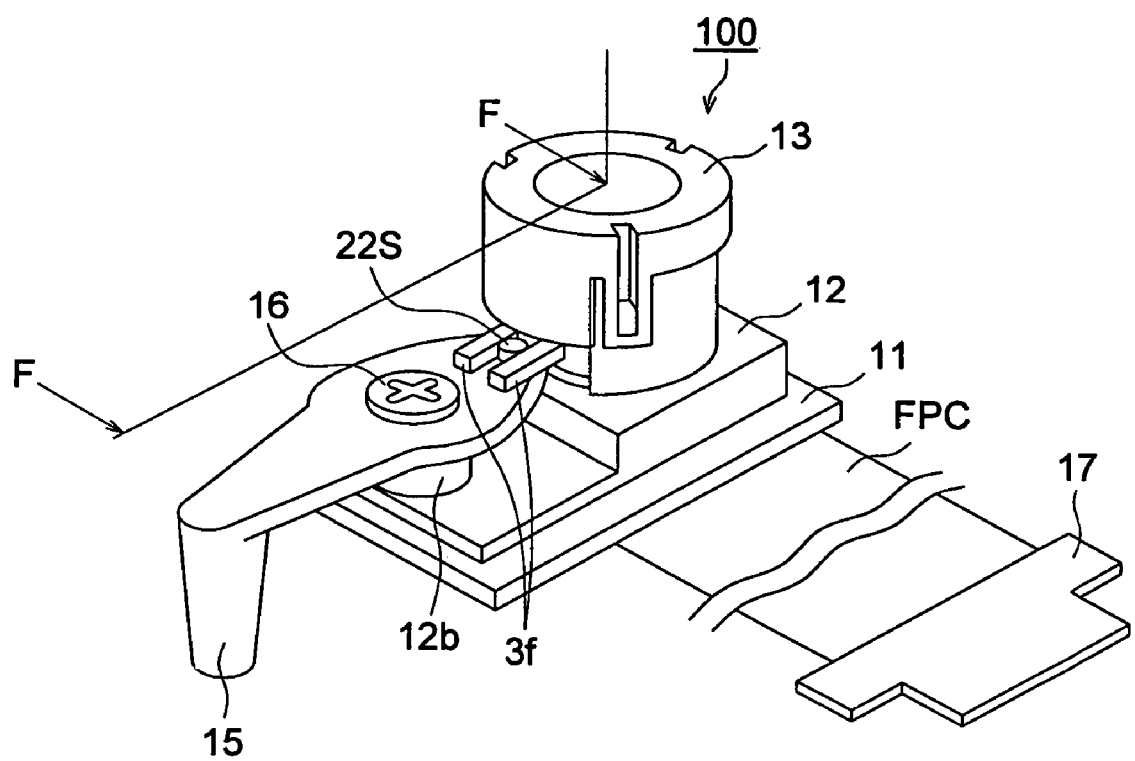
FIG. 2 is a perspective view of an image pickup device 100 in a first embodiment of the present invention.

FIG. 2 is a perspective view of an image pickup device 100 in a first embodiment of the present invention. The image pickup device 100 in FIG. 2 is equivalent to the image pickup device S of FIG. 1.

As shown in FIG. 2, the image pickup device 100 has an outer surface including: a printed circuit board 11 on which an image pickup element is mounted; a connector circuit board 17 for connection to any other control circuit board of a hand-held terminal having the image pickup device 100; a flexible printed cable (FPC) that connects the printed circuit board 11 and the connector circuit board 17; an outer frame member 12; a cover member 13 mounted on an upper face of the outer frame member 12; an operating member 15 that is pivotally installed on a boss 12b integrally formed on the outer frame member 12; and a shoulder screw 16 that pivotally secures the operating member 15.

Figure 3A:
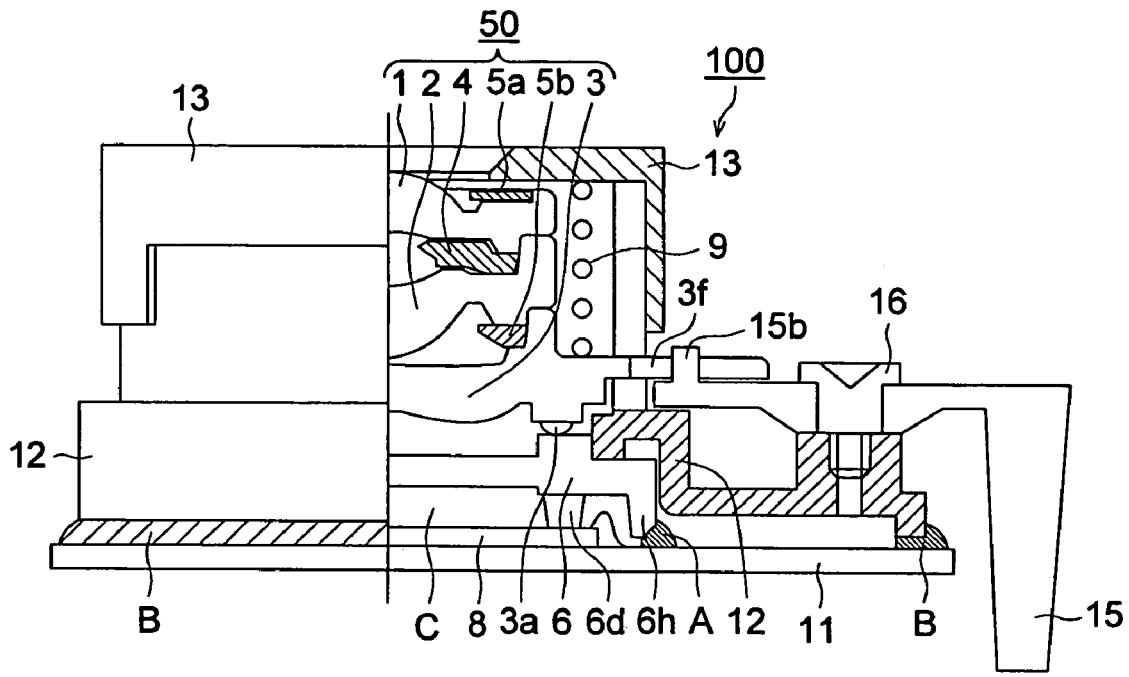
FIGS. 3(a) and 3(b) are sectional views of the image pickup device 100, taken along line F-F of FIG. 2.

FIG. 3(a) is a sectional view of the image pickup device 100, taken along line F-F of FIG. 2. In the description below, the same reference number or symbol is assigned to the same member in order to avoid duplication of the description.

In FIG. 3(a), the inside of the outer frame member 12 includes: an image pickup optical system 50 that includes, from the photographic object side in order, a first lens 1, an aperture stop 4 for determining an aperture F-number of the image pickup optical system, a second lens 2, fixed diaphragms 5a and 5b, both for shielding unnecessary light, and a third lens 3; a mounting base 6; image pickup element 8 mounted on the printed circuit board 11; a compression coil spring 9 that is an energizing member; and the cover member 13.

On the mounting base 6 according to the present invention, a leg 6d that abuts on the image pickup element 8 is formed in at least three places at the side facing an imaging surface.

Figure 4:
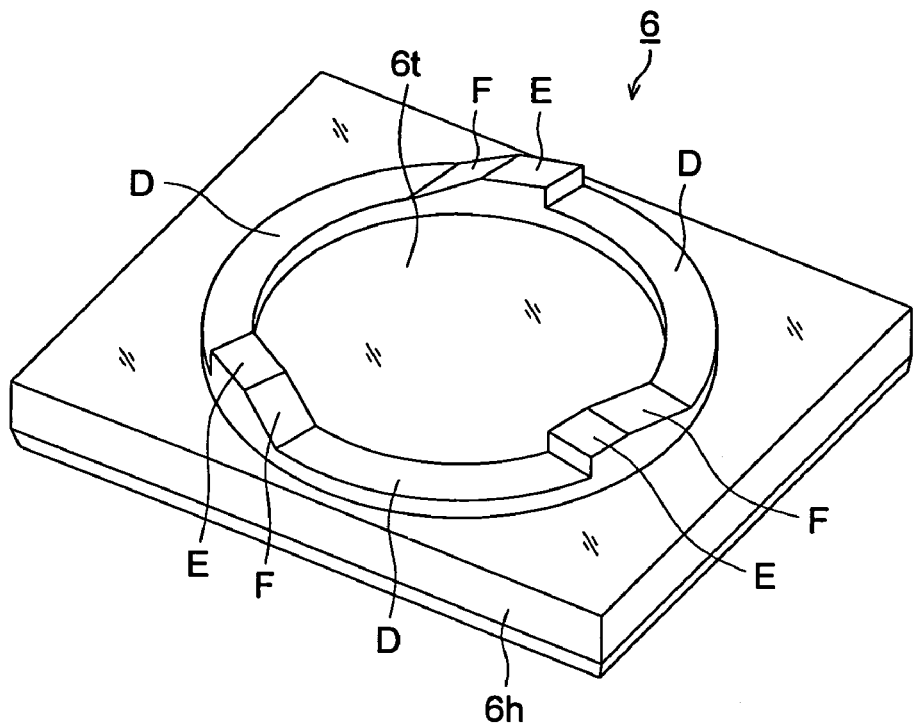
FIG. 4 is a perspective view of the mounting base used for the image pickup device 100.

FIG. 4 is a perspective view of the mounting base 6 used for the image pickup device 100. This figure shows the mounting base 6 when it is viewed from a direction of the image pickup optical system 50.

The mounting base 6 is molded using a light-transmissive material. As shown in FIG. 4, on the side of the base 6 that faces the image pickup optical system 50, a horizontal plane D of a small vertical size, a horizontal plane E of a large vertical size, and an inclined plane F that continuously connects both horizontal planes D, E, are formed at intervals of approximately 120° (hereinafter, the three planes are referred to collectively as a cam surface). Additionally, the mounting base 6 includes an imaging light flux transmitting section 6t formed on a parallel planar plate, and a housing 6h formed into a square box shape.

Referring back to FIG. 3(*a*), the mounting base 6 is assembled such that the housing 6h surrounds the image pickup element 8, and as shown, the printed circuit board 11 and housing 6h that are to be bonded together at positions different from the legs 6d are bonded and sealed using an adhesive A (for example, an ultraviolet-curing type of adhesive). That is to say, the mounting base 6 thus constructed seals and isolates a space present at the photoelectric conversion plane side of the image pickup element 8. Thus, entry of dust from outside into this space can be prevented.

In addition, the leg section 6d and the bonded section of the housing 6h constitute faces different from each other. This prevents the adhesive A from entering a lower portion of the leg section 6d, and thus prevents misalignment of the image pickup optical system in a direction of its optical axis.

Furthermore, the outer frame member 12 has its outer surface bonded onto and fixed to the printed circuit board 11 via an adhesive B (for example, an adhesive that contains rubber).

Figure 3B:
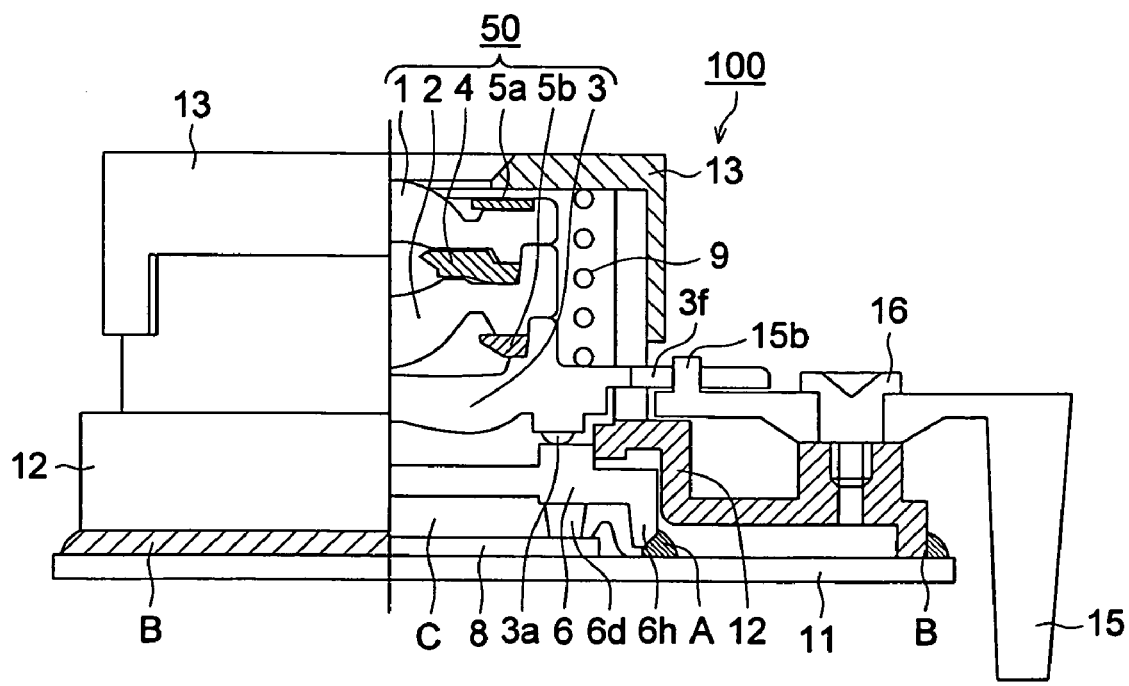

FIG. 3(*b*) shows an example in which the outer frame member 12 is abutted on the printed circuit board 11 before being bonded onto and fixed to the board 11 via the adhesive B. This method, compared with the one shown in FIG. 3(*a*), makes it possible to reduce physical shocks on the mounting base 6, in the direction of the optical axis, and consequently to further reduce any effects of the external shocks applied to the image pickup element 8, by abutting the outer frame member 12 on the printed circuit board 11 and further providing a space at the abutting section between the mounting base 6 and the outer frame-member 12.

The image pickup optical system 50 has, as shown, the first lens 1, the second lens 2, and the third lens 3 first abutted on one another at a flange section present in a region other than optically effective faces, and then fixedly bonded onto one another using an adhesive or the like. Thus, the lenses 1 to 3 are integrated into a unit, and the three lenses are assembled without a mutual spatial interval error by being constructed not via other members.

Protrusions 3a are formed at intervals of approximately 120° at the imaging surface side of the third lens 3 which is one constituent element of the image pickup optical system 50. The protrusions 3a are arranged in associated form with respect to the cam surface formed on the mounting base 6, and the image pickup optical system 50 abuts on the cam surface of the mounting base 6 via the protrusions 3a. Additionally, at the photographic object side of the flange section of the third lens 3, the compression coil spring 9 is mounted between the cover member 13 and the flange section of the third lens 3. This compression coil spring 9 energizes the image pickup optical system 50 and the mounting base 6 in a direction of the image pickup element 8.

Meanwhile, the boss 15b formed on the operating member 15 pivotally held by the shoulder screw 16 is assembled in engagement with a bifurcate section 3f of the third lens 3, as shown in FIG. 2. The operating member 15 exposed from the opening 74 in the hand-held terminal T shown in FIG. 1 is a section operated by a user.

In the image pickup device 100 that has thus been constructed, when the operating member 15 is pivotally operated, the bifurcate section 3f of the third lens 3 that engages with the boss 15b is also pivoted and the protrusions 3a formed on the third lens 3 move from the low horizontal plane D of the cam surface via the inclined plane F to the high horizontal plane E to thereby move the image pickup optical system 50 in a direction of the photographic object, along the optical axis. Long-distance photographing and short-distance photographing can thus be switched from each other.

In other words, it is possible, by sealing with the mounting base 6 the space formed at the photoelectric conversion side of the image pickup element 8, to solve the problem that the dust that may have entered from outside or occurred during internal operation moves round, sticks to the image pickup element 8, and causes image data trouble. In addition, forming the cam surface on the mounting base 6 which has the legs 6d abutted on the image pickup element 8, and then abutting the image pickup optical system energized by the energizing member, on the cam surface, permits only the mounting base 6 to intervene as a component involved With a position in the direction of the optical axis. Consequently, it is also possible to position the image pickup element and the image pickup optical system accurately in the direction of the optical axis and to obtain an image pickup device capable of close-up photographing as well.

Second Embodiment

The following describes a second embodiment of the present invention. The second embodiment is an example in which a space at the photoelectric conversion side of an image pickup element is sealed using a mounting base and a part of an outer frame member.

An external view of a hand-held telephone T having an image pickup device 150 of the second embodiment, and a perspective view of this image pickup device are omitted from the description since both views are the same as those of FIGS. 1 and 2. Also, the image pickup device 150 below is equivalent to the image pickup device S of FIG. 1.

Figure 5:
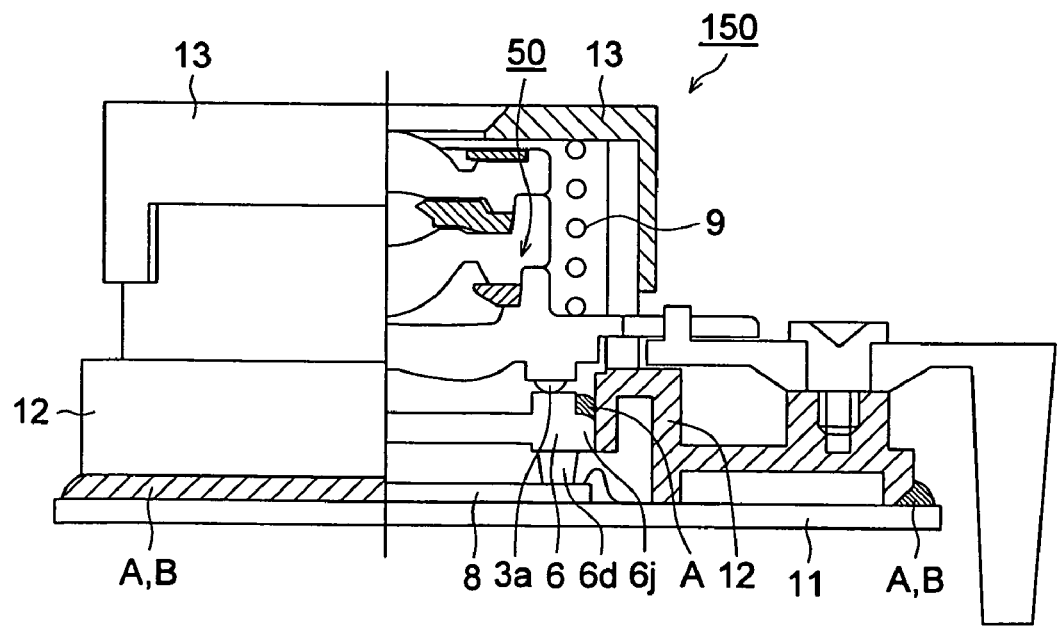
FIG. 5 is a sectional view of an image pickup device 150 according to a second embodiment of the present invention, the view being taken along line F-F of FIG. 2.

FIG. 5 is a sectional view of the image pickup device 150 according to the second embodiment of the present invention, the view being taken along line F-F of FIG. 2. In the description below, the same reference number or symbol is assigned to the same member in order to avoid duplication of the description. Also, only sections different from those of the first embodiment are described in detail.

In FIG. 5, the inside of an outer frame member 12 includes: an image pickup optical system 50 of essentially the same structure as that shown in FIG. 3(*a*); a mounting base 6; an image pickup element 8 mounted on a printed circuit board 11; a compression coil spring 9 that is an energizing member; and a cover member 13.

As shown in FIG. 3(*a*), on the mounting base 6, a leg 6d that abuts on the image pickup element 8 is formed in at least three places at the side facing an imaging surface.

Figure 6:
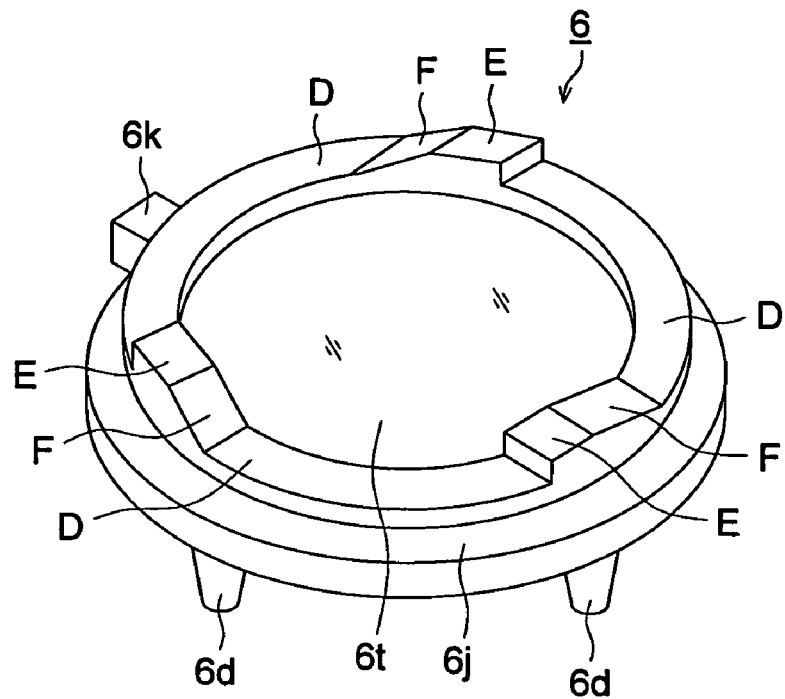
FIG. 6 is a perspective view of the mounting base used for the image pickup device 150.

FIG. 6 is a perspective view of the mounting base 6 used for the image pickup device 150. This figure shows the mounting base 6 when it is viewed from a direction of the image pickup optical system 50.

As shown in FIG. 6, the mounting base 6 is molded using a light-transmissive material. Similarly to FIG. 4, on the side of the base 6 that faces the image pickup optical system 50, a horizontal plane D of a small vertical size, a horizontal plane E of a large vertical size, and an inclined plane F that continuously connects both horizontal planes D, E, are also formed at intervals of approximately 120° (hereinafter, the three planes are referred to collectively as a cam surface). Additionally, the mounting base 6 includes: an imaging light flux transmitting section 6t formed on a parallel planar plate; a collar 6j; and a positioning protrusion 6k.

Referring back to FIG. 5, the mounting base 6 is assembled such that the positioning protrusion 6k and a notch (not shown) formed in the outer frame member 12 are matched in position, and as shown, the collar 6j, positioning protrusion 6k, and inner contact surface of outer frame member 12 that are to be bonded together are bonded and sealed using an adhesive A (for example, an ultraviolet-curing type of adhesive). In addition, the outer frame member 12 has its outer surface bonded onto and fixed to the printed circuit board 11 via the adhesive A first and then an adhesive B (for example, an adhesive that contains rubber). In this case, the adhesive B is for reinforcement only and may be omitted.

That is to say, the mounting base 6 and the outer surface of the outer frame member 12 serve to seal and isolate the space formed at the photoelectric conversion plane side of the image pickup element 8. Thus, entry of dust from outside into this space can be prevented.

In the image pickup device 150 that has thus been constructed, the image pickup optical system 50 can move in a direction of a photographic object, along an optical axis, during operation similar to that described in FIG. 3(a). Long-distance photographing and short-distance photographing can thus be switched from each other.

In other words, it is possible, by sealing with the mounting base 6 and a part of the outer frame member the space formed at the photoelectric conversion side of the image pickup element 8, to solve the problem that the dust that may have entered from outside or occurred during internal operation moves round, sticks to the image pickup element 8, and causes image data trouble. In addition, forming the cam surface on the mounting base 6 which has the legs 6d abutted on the image pickup element 8, and then abutting the image pickup optical system energized by the energizing member 9, on the cam surface, permits only the mounting base 6 to intervene as a component involved with a position in a direction of the optical axis. Consequently, it is also possible to position the image pickup element and the image pickup optical system accurately in the direction of the optical axis and to obtain an image pickup device capable of close-up photographing as well.

Third Embodiment

The following describes a third embodiment of the present invention. The third embodiment is an example in which a mounting base has horizontal abutting faces each formed with a different height and an image pickup optical system is assembled using either of the abutting faces selectively.

A hand-held telephone T with an image pickup device of the third embodiment has an appearance from which an opening 74 and an operating member 15 are omitted/deleted from the external view of FIG. 1. The image pickup device 200 below is equivalent to the image pickup device S of FIG. 1.

Figure 7:
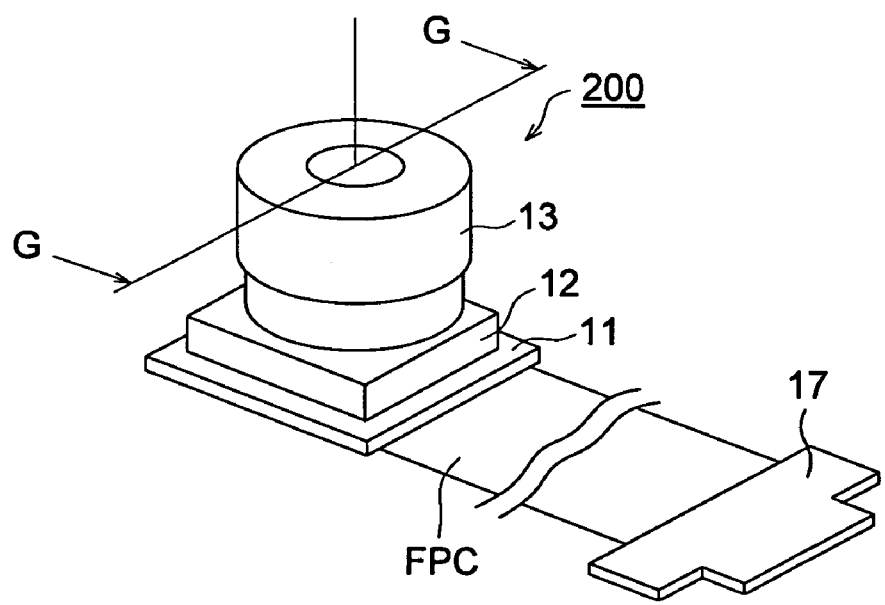
FIG. 7 is a perspective view of an image pickup device 200 of a third embodiment of the present invention.

FIG. 7 is a perspective view of the image pickup device 200 according to the third embodiment of the present invention. In the description below, the same reference number or symbol is assigned to the same functional member in order to avoid duplication of the description. Also, only sections different from those of the above-described first and/or second embodiment are described in detail.

As shown in FIG. 7, the image pickup device 200 has an outer surface including: a printed circuit board 11 on which an image pickup element is mounted; a connector circuit board 17 for connection to any other control circuit board of the hand-held terminal; a flexible printed cable (FPC) that connects the printed circuit board 11 and the connector circuit board 17; an outer frame member 12; and a cover member 13 mounted on an upper face of the outer frame member 12.

Figure 8:
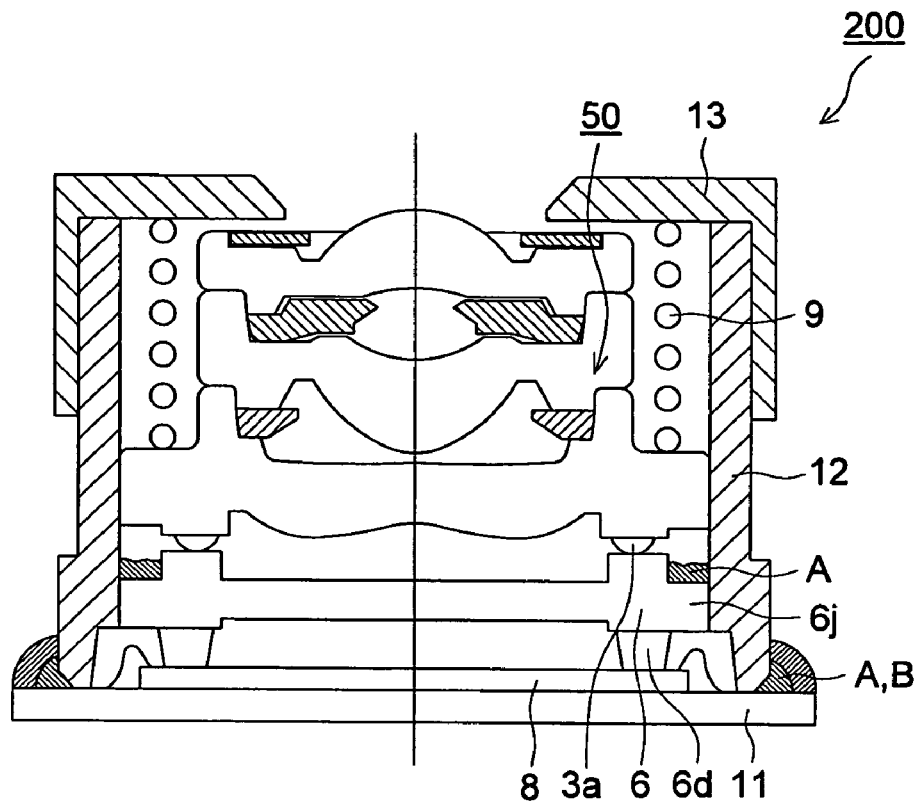
FIG. 8 is a sectional view of the image pickup device 200 according to the third embodiment of the present invention, the view being taken along line G-G of FIG. 7.

FIG. 8 is a sectional view of the image pickup device 200 according to the third embodiment of the present invention, the view being taken along line G-G of FIG. 7.

In FIG. 8, the inside of the outer frame member 12 includes: an image pickup optical system 50 of essentially the same structure as that shown in FIG. 3(a); a mounting base 6; an image pickup element 8 mounted on the printed circuit board 11; a compression coil spring 9 that is an energizing member; and the cover member 13. As shown in FIG. 8, on the mounting base 6, a leg 6d that abuts on the image pickup element 8 is formed in at least three places at the side facing an imaging surface.

At the photographic object side of a flange section of a third lens 3 which is a constituent element of the image pickup optical system 50, the compression coil spring 9 is mounted between the cover member 13 and the flange section of the third lens 3. This compression coil spring 9 energizes the image pickup optical system 50 and the mounting base 6 in a direction of the image pickup element 8.

Figure 9:
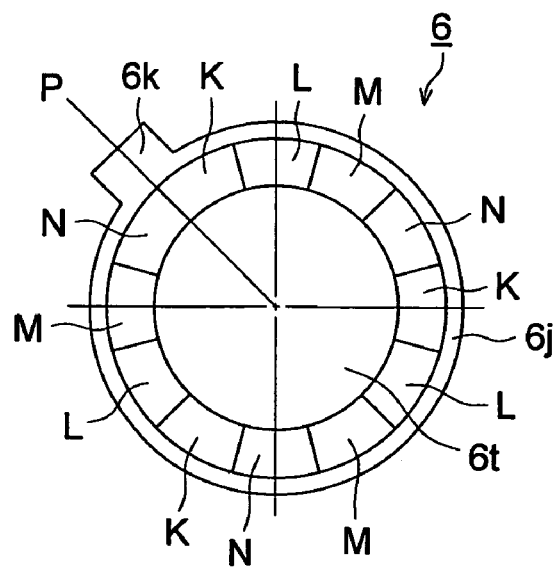
FIG. 9 is a plan view of the mounting base used for the image pickup device 200.

FIG. 9 is a plan view of the mounting base 6 used for the image pickup device 200. The base 6 when viewed from the image pickup optical system 50 is shown in FIG. 9.

In FIG. 9, the mounting base 6 is molded using a light-transmissive material, and has horizontal planes K, L, M, N each formed with a different height at intervals of approximately 120° so as to face the image pickup optical system 50. The mounting base 6 also has horizontal planes of the same height, at three alternate positions. That is, the planes assigned the same symbol in FIG. 9 are of the same height from an abutting surface of the leg 6d (see FIG. 8), and four kinds of horizontal planes each different in height are formed. Additionally, the mounting base 6 includes an imaging light flux transmitting section 6t formed on a parallel planar plate; a collar 6j; and a positioning protrusion 6k.

The positioning protrusion 6k is adapted to engage with a positioning portion formed on the outer frame member 12, to thereby implement positioning in a circumferential direction. As shown, respective boundary lines of the above-described horizontal planes are pitched at an angle of 30° with a bisector P of the positioning protrusion 6k as a reference line.

Referring back to FIG. 8, the mounting base 6 is assembled such that the positioning protrusion 6k and a notch (not shown) formed in the outer frame member 12 are matched in position, and as shown, the collar 6j, positioning protrusion 6k, and inner contact surface of outer frame member 12 that are to be bonded together are bonded and sealed using an adhesive A (for example, an ultraviolet-curing type of adhesive). In addition, the outer frame member 12 has its outer surface bonded onto and fixed to the printed circuit board 11 via the adhesive A first and then an adhesive B (for example, an adhesive that contains rubber). In this case, the adhesive B is for reinforcement only and may be omitted.

That is to say, the mounting base 6 and the outer surface of the outer frame member 12 serve to seal and isolate the space formed at the photoelectric conversion plane side of the image pickup element 8. Thus, entry of dust from outside into this space can be prevented.

Figure 10:
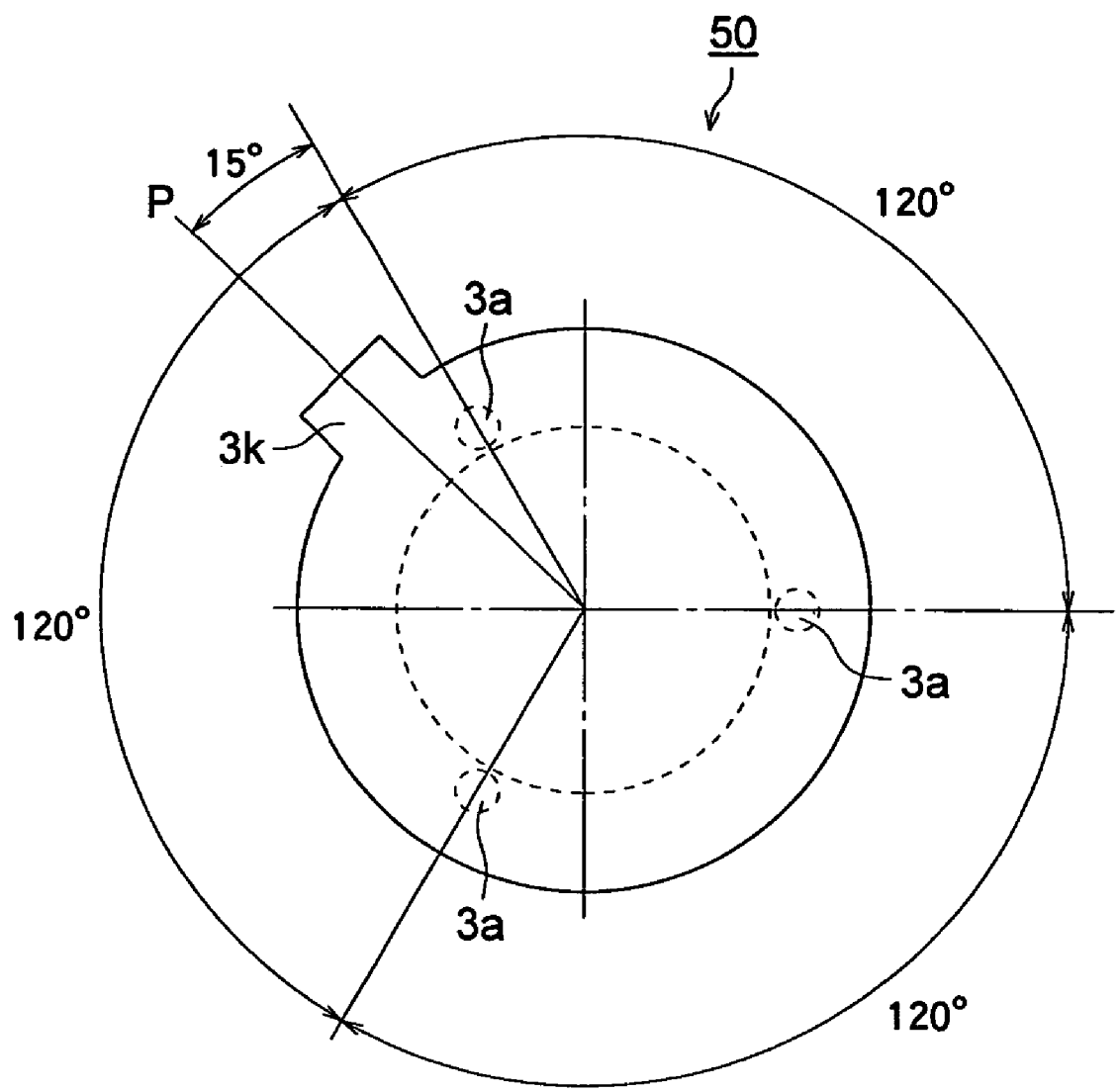
FIG. 10 is a schematic plan view showing the relationship in position between abutting protrusions formed on an image pickup optical system, and a positioning protrusion.

FIG. 10 is a schematic plan view showing a positional relationship between abutting protrusions 3a formed on the image pickup optical system 50, and a positioning protrusion 3k. The image pickup optical system 50 when viewed from a direction of the photographic object is shown in FIG. 10, with each of the abutting protrusions 3a being shown with a broken line.

At the imaging surface side of the third lens 3 which is a constituent element of the image pickup optical system 50, the protrusions 3a for abutting on the mounting base 6 are formed and the image pickup optical system 50 abuts on either of the horizontal planes of the mounting base via the protrusions 3a. As shown, one such protrusion 3a is formed in three places at intervals of 120° with a position 15° shifted from a bisector P of the positioning protrusion 3k, as a reference line.

The following describes a method of assembling the mounting base 6 of FIG. 9 and the image pickup optical system 50 of FIG. 10 into the outer frame member 12 and selectively abutting either of the foregoing four different horizontal planes K, L, M, N.

FIGS. 11(a), 11(b), 11(c), and 11(d) are schematic plan views showing a positional relationship between the outer frame member 12, the positioning protrusion 6k of the mounting base 6, and the positioning protrusion 3k of the third lens.

As shown in FIGS. 11(a) to 11(d), four concave portions W, X, Y, Z that engage with the positioning protrusion 6k of the mounting base 6 and the positioning protrusion 3k of the image pickup optical system are formed at intervals of 90° in the outer frame member 12.

Figure 11:
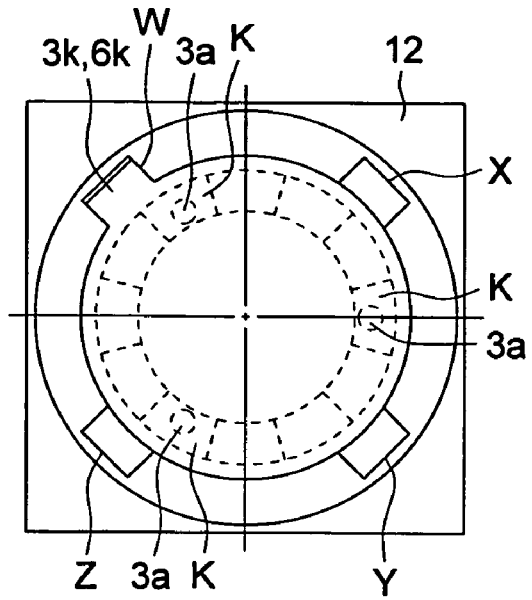
FIGS. 11(a), 11(b), 11(c), and 11(d) are schematic plan views showing the relationship in position between an outer frame member, a positioning protrusion of a mounting base, and a positioning protrusion of a third lens.
Figure 11:
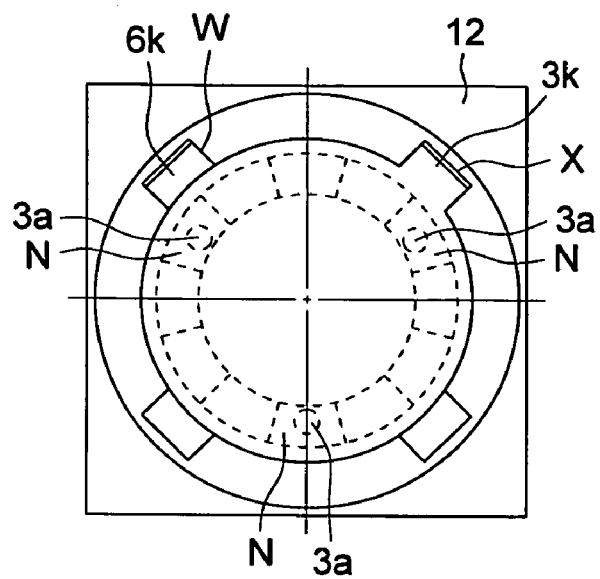
Figure 11:
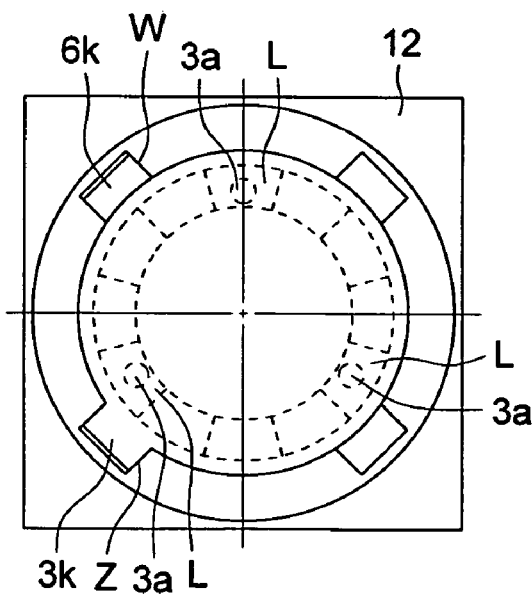
Figure 11:
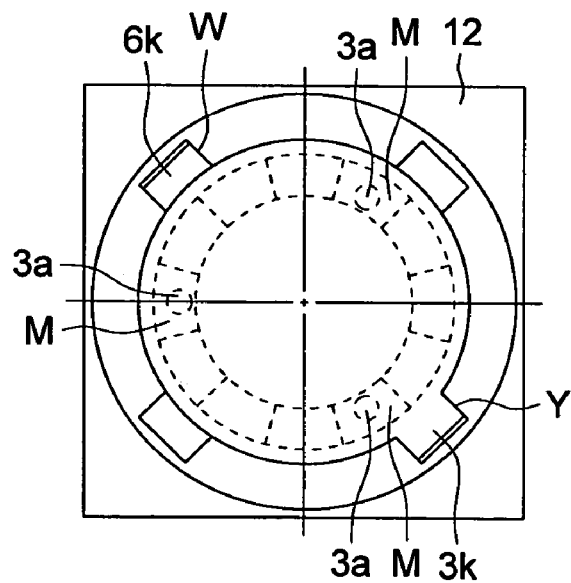

FIG. 11(a) shows an example in which both the positioning protrusion 6k of the mounting base 6 and the positioning protrusion 3k of the image pickup optical system are engaged with the concave portion W. In this example, the three abutting protrusions 3a of the third lens are positioned on the horizontal plane K formed on the mounting base 6.

FIG. 11(b) shows an example in which the positioning protrusion 6k of the mounting base 6 is engaged with the concave portion W and the positioning protrusion 3k of the image pickup optical system is engaged with the concave portion X. In this example, the three abutting protrusions 3a of the third lens are positioned on the horizontal plane N formed on the mounting base 6.

FIG. 11(c) shows an example in which the positioning protrusion 6k of the mounting base 6 is engaged with the concave portion W and the positioning protrusion 3k of the image pickup optical system is engaged with the concave portion Z. In this example, the three abutting protrusions 3a of the third lens are positioned on the horizontal plane L formed on the mounting base 6.

FIG. 11(d) shows an example in which the positioning protrusion 6k of the mounting base 6 is engaged with the concave portion W and the positioning protrusion 3k of the image pickup optical system is engaged with the concave portion Y. In this example, the three abutting protrusions 3a of the third lens are positioned on the horizontal plane M formed on the mounting base 6.

That is to say, four kinds of positions on the optical axis of the image pickup optical system (namely, the image pickup element and the third lens) can be selected by selecting either of the four concave portions in the outer frame member 12, for the protrusion 6k of the mounting base 6, and assembling the protrusion 3k of the third lens into that selected concave portion.

Such selective assembly using either of the four concave portions formed in the outer frame member 12 makes it possible to absorb manufacturing variations in back focus of the image pickup optical system, and hence to obtain an image pickup device whose focus is always set to a required object distance. The selection of these concave portions may be based on independent measurement for each image pickup optical system or conducted on a manufacturing lot basis.

In the above-described first to third embodiments, the mounting base 6 is molded using a material that has an infrared light cutoff function to shield infrared light. The image pickup device can be reduced in thickness by doing so. Also, the imaging light flux transmitting section 6t of the mounting base 6 may be coated for infrared light cutoff or bonded and sealed using an infrared light cutoff film made of glass, or the cover member 12 can, of course, be sealed with an infrared light cutoff film made of glass.

In addition, while the construction using the mounting base which has a cam surface or horizontal planes of different heights has been described above, even if the abutting planes of the mounting base with respect to the image pickup optical system are formed with the same height, this form of formation is, of course, within the scope of the present invention.

Furthermore, while a compression coil spring has been described above as the energizing member, this member may, of course, be a plate spring, a sponge-like energizing member, or the like.

Fourth Embodiment

The following describes a fourth embodiment of the present invention. Although the constructions using a mounting base have been described in the foregoing first to third embodiments. The fourth embodiment, however, is an example in which a part of an optical member which forms an image pickup optical system is formed at an imaging light flux transmitting section of a mounting base.

A hand-held telephone T with an image pickup device of the fourth embodiment has an appearance from which an opening 74 and an operating member 15 are omitted/deleted from the external view of FIG. 1. The image pickup device 300 below is equivalent to the image pickup device S of FIG. 1. Description of the image pickup device 300 according to the fourth embodiment of the present invention is omitted since the device 300 has essentially the same shape as that shown in FIG. 7.

Figure 12:
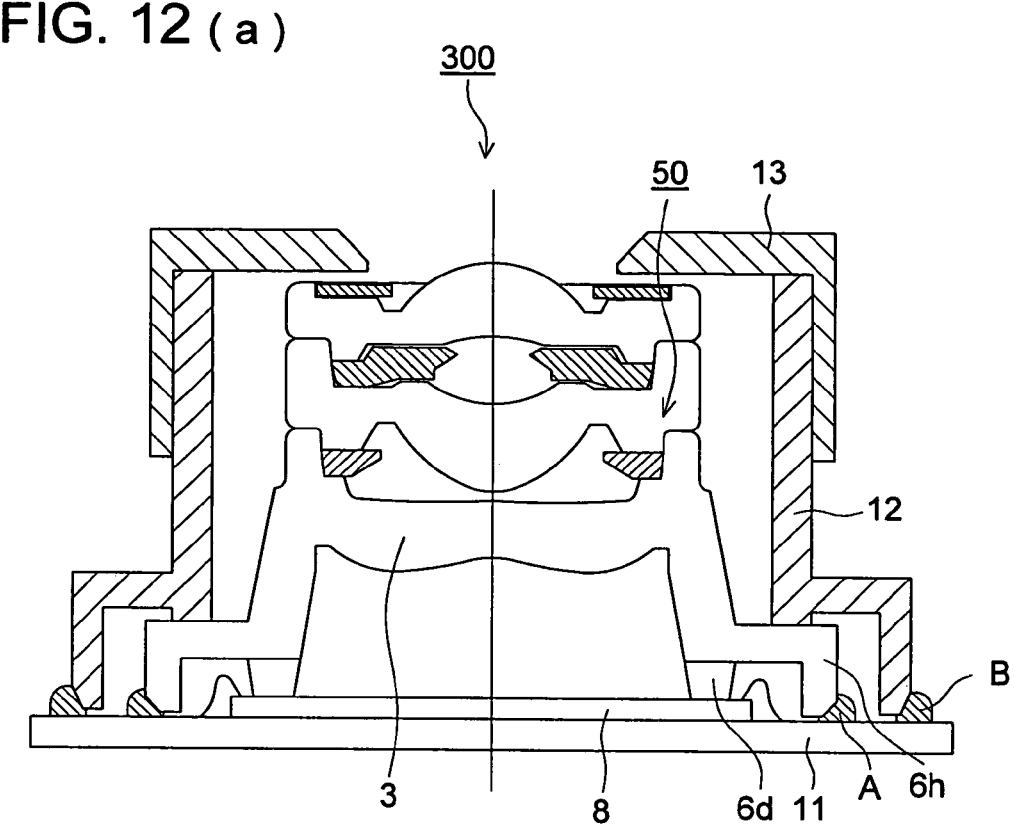
FIGS. 12(a) and 12(b) are sectional views of an image pickup device 300 of a fourth embodiment of the present invention, both taken along line G-G of FIG. 7.
Figure 12:
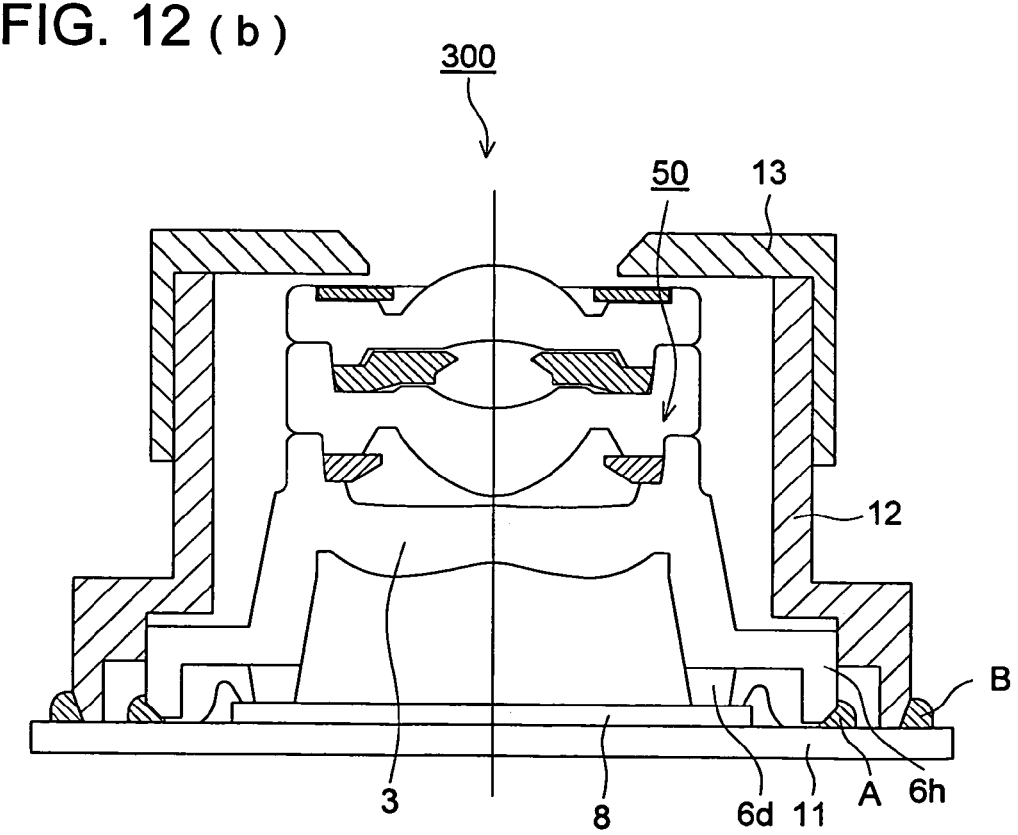

FIG. 12(a) is a sectional view of the image pickup device 300 of the fourth embodiment of the present invention, the view being taken along line G-G of FIG. 7.

In FIG. 12(a), the inside of an outer frame member 12 includes: an image pickup optical system 50, an image pickup element 8 mounted on a printed circuit board 11, and a cover member 13. A third lens 3 forming the image pickup optical system 50 is formed with a square or circular box-shaped housing 6h that contains a leg section 6d and the image pickup element 8. That is, the third lens is formed at the abovementioned imaging light flux transmitting section of a mounting base.

The image pickup optical system 50 is assembled using the thus-formed third lens 3, and as shown, after the leg section 6d has been abutted on the image pickup element 8, the housing 6h and printed circuit board 11 that are to be bonded together at positions different from the leg section 6d are bonded and sealed using an adhesive A (for example, an ultraviolet-curing type of adhesive). This means that the third lens 3 serves to seal and isolate a space formed at the photoelectric conversion plane side of the image pickup element 8. Thus, entry of dust from outside into the space can be prevented.

In addition, the leg section 6d and the bonded section of the housing 6h constitute faces different from each other. This prevents the adhesive A from entering a lower portion of the leg section 6d, and thus prevents misalignment of the image pickup optical system in a direction of its optical axis.

Furthermore, the outer frame member 12 has its outer surface bonded onto and fixed to the printed circuit board 11 via an adhesive B (for example, an adhesive that contains rubber).

FIG. 12(b) shows an example in which the outer frame member 12 is abutted on the printed circuit board 11 before being bonded onto and fixed to the board 11 via the adhesive B. This method, compared with the one shown in FIG. 12(a), makes it possible to reduce physical shocks on the mounting base 6, in the direction of the optical axis, and consequently to further reduce any effects of the external shocks applied to the image pickup element 8, by abutting the outer frame member 12 on the printed circuit board 11 and further providing a space at the abutting section between the mounting base 6 and the outer frame member 12.

The image pickup optical system 50 has, as shown, a first lens 1, a second lens 2, and a third lens 3 first abutted on one another at a flange section present in a region other than optically effective faces, and then fixedly bonded onto one another using an adhesive or the like. Thus, the lenses 1 to 3 are integrated into a unit, and the three lenses are assembled without a mutual spatial interval error by being constructed not via other members. In this case, compression coil spring usage as an energizing member can be discontinued.

In this case, either of the optically effective faces that constitute the image pickup optical system 50 is provided with infrared light cutoff coating to prevent transmission of infrared light and thus cut off the infrared light.

It becomes possible, by doing so, to reduce the number of components and to reduce costs.

Fifth Embodiment

A fifth embodiment will be described hereunder.

Figure 13:
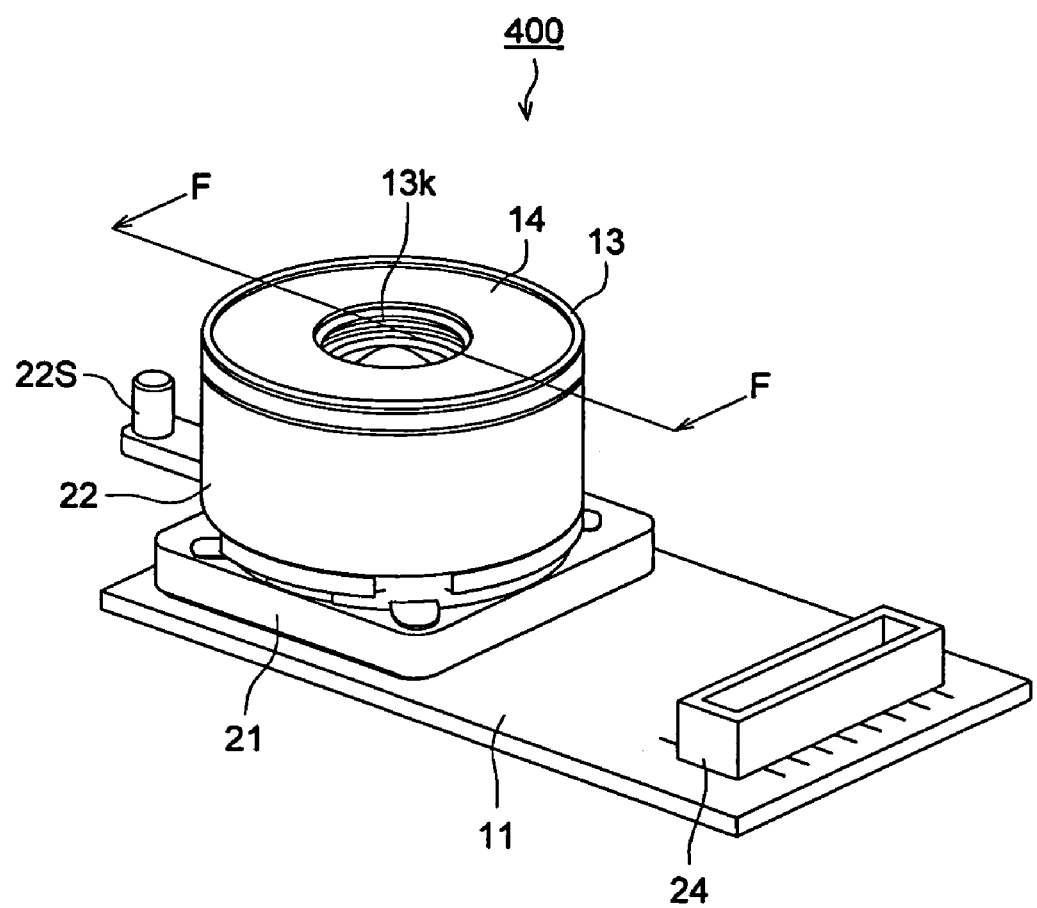
FIG. 13 is a perspective view of an image pickup device 400 according to the present invention.

FIG. 13 is a perspective view of an image pickup device 400 according to the present invention. The image pickup device 400 is built into a position of the image pickup device S shown in FIG. 1.

As shown in FIG. 13, the image pickup device 400 has an outer surface including: a printed circuit board 11 on which an image pickup element is mounted; a connector 24 for connection to any other control circuit board of a hand-held terminal; a base member 21; a cover member 13 having an opening 13k; a decorative plate 14; and a pivoting member 22 on which an operating member 22s for pivotal movement is formed. The operating member 22s is internally coupled in a mechanical fashion to the manual operating member 15 shown in FIG. 1, and the pivoting member 22 is adapted to pivot in cooperative association with the manual operating member 15. Also, various electrical components such as resistors and capacitors, although not shown, are mounted on the printed circuit board 11.

When built into a hand-held terminal, the image pickup device 400 is mounted in the cover member 13 or the decorative plate 14 in such a way as to be pressed against cover glass via a rubber O-ring or the like. After the image pickup device 400 has been built into the hand-held terminal, therefore, dust does not enter from the opening 13k. Before the image pickup device 400 is built into the hand-held terminal, the opening 13k is shielded with a sheet material or the like to thereby prevent entry of dust.

Figure 14:
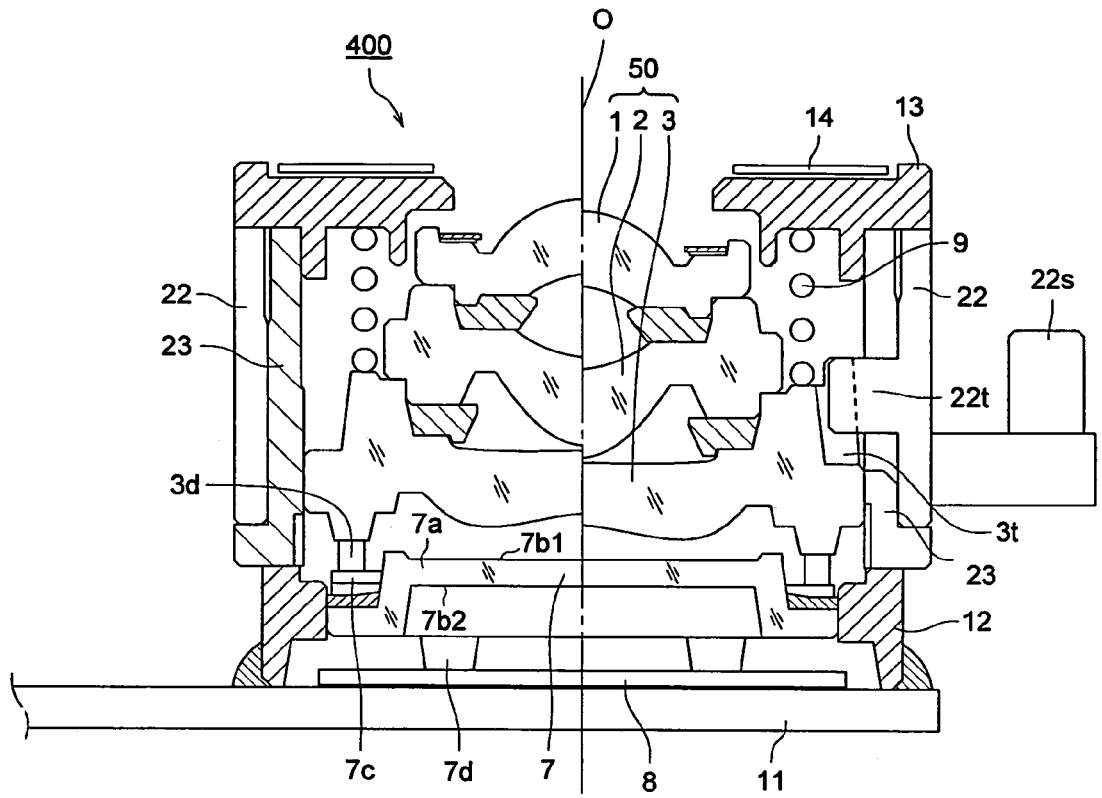
FIGS. 14(a) and 14(b) are schematic sectional views showing an internal structure of the image pickup device 400 of the present invention.
Figure 14:
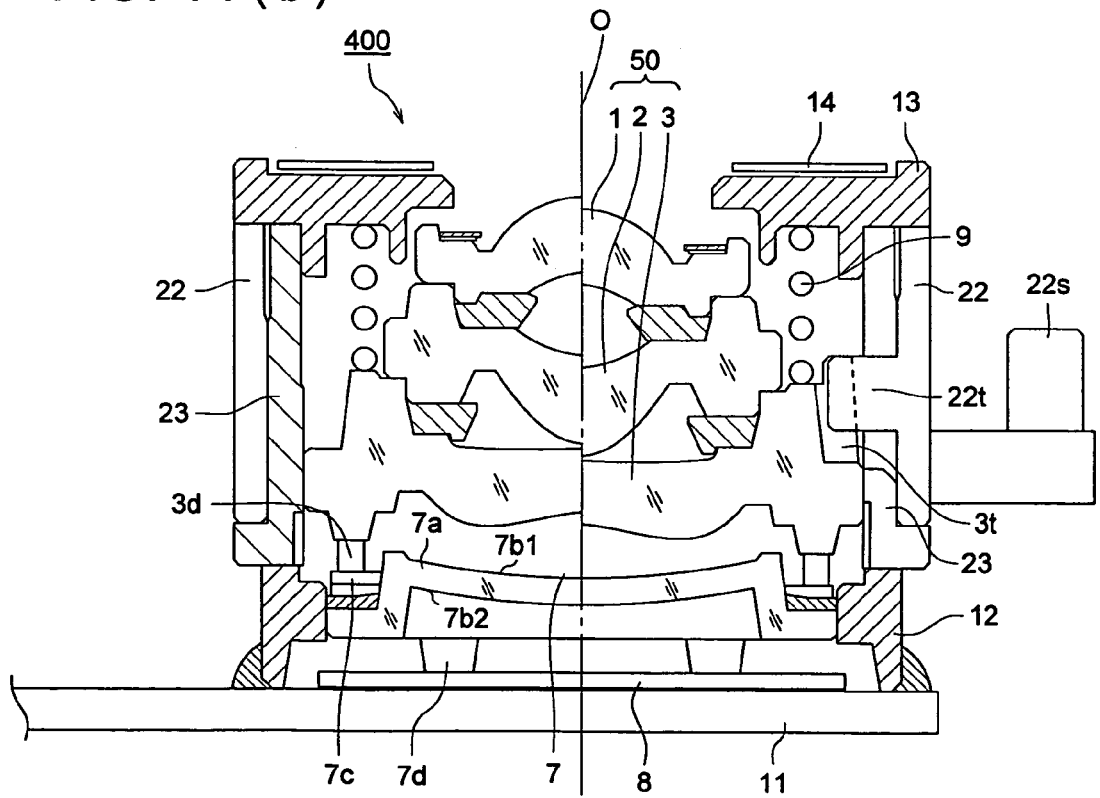

FIGS. 14(a) and 14(b) are schematic sectional views showing an internal structure of the image pickup device 400 of the present invention. These figures show the internal structure in sectional view taken along line F-F of FIG. 13. More specifically, the right side of an optical axis O of an image pickup optical system shows a state in which a focal point thereof is adjusted to a hyperfocal distance, and the left side shows the macro-photographing state established when the focal point of the image pickup optical system is moved through a required distance towards a photographic object and adjusted to a short distance. In the description below, the same reference number or symbol is assigned to the same functional member in order to avoid duplication of the description. The following description is given using FIG. 14(a).

As shown in FIG. 14(a), an image pickup optical system 50 has an outer surface including a first lens 1, a second lens 2, a third lens 3, and diaphragms installed for each of the lenses, is disposed inside the outer frame member 12. A cam member 7 with a cam portion 7c formed at the position where the cam portion abuts on three protrusions (abutting sections) 3d integrally formed in a region other than optically effective faces of the third lens, at the imaging surface side, is also disposed inside the outer frame member 12. In addition, an image pickup element 8 mounted on the printed circuit board 11 is disposed inside the image pickup optical system 50.

As shown, the first lens 1, the second lens 2, and the third lens 3 are first abutted on one another at a flange section present in a region other than optically effective faces, and then fixedly bonded onto one another using an adhesive or the like. Thus, the lenses 1 to 3 are integrated into a unit, and the three lenses are assembled without a mutual spatial interval error by being constructed not via other members.

The cam member 7 uses a light-transmissive material and has an object light flux transmitting section 7a formed so as to cover the photoelectric conversion side of the image pickup element. The light-transmitting section 7a has faces 7b1, 7b2, and of the two faces, only the face 7b1 at the incident side of object light is formed at a protruding position with respect to a cam surface, and coated to cut off infrared light. Also, a plurality of legs 7d are integrally formed at the cam member 7, and each leg 7d abuts on a region other than a photoelectric conversion planet at the photoelectric conversion side of the image pickup element 8.

The cam surface that determines a position of the image pickup optical system 50 in an optical-axis direction thereof is accurately positioned with respect to the image pickup element 8 by abutting the legs 7d thereon as described above.

In the image pickup optical system 50 that has thus been integrated into a single unit, the third lens 3 has its flange section energized in a direction of the image pickup element 8 by a compression coil spring 9 that is an energizing member. A spatial interval of the image pickup optical system 50 in the optical-axis direction with respect to the image pickup element 8 is thus determined via the cam member 7.

The cam member 7 engages with an interior of the base member 21 and is bonded and held using an adhesive. Additionally, the base member 21 is bonded onto and fixed to the printed circuit board 11 via an adhesive. The kind of adhesive used to bond the cam member 7 and the base member 21 together is selected so that for alleviated physical shocks on the image pickup element 8, after-curing hardness of the adhesive is lower than that of the adhesive used to fix the base member and the printed circuit board (i.e., after curing, the adhesive selected for the former bonding process becomes softer than the adhesive selected for the latter bonding process). Furthermore, the base member 21 has an outer frame member 23 an assembled to contain the image pickup optical system 50. The pivoting member 22 is pivotally assembled on an outside face of the outer frame member 23. The pivoting member 22 is assembled so that an engagement section 22t formed internally in integral form engages with an engagement section 3t of the third lens 3. The cover member 13 is mounted on the outer frame member 23 after the compression coil spring 9 has been mounted.

The outer frame member 23 also has an opening to form a pivoting region for the engagement section 22t formed on the pivoting member 22. As shown, this opening is shielded with the pivoting member 22 [see the right side of the optical axis in FIG. 14(a)].

That is, pivoting the operating member 22s of the pivoting member 22 supported outside the outer frame member 23 pivots the engagement section 22t formed on the pivoting member 22. Along with such pivoting, the third lens 3 engaging with the engagement section 22t, namely, the image pickup optical system 50 also pivots and the protrusions 3d of the third lens 3 move along the cam surface on the cam portion 7c of the cam member 7. Thus, movement in a direction of the optical axis O in defiance of the energizing force of the compression coil spring 9 is generated to yield a macro-photographing state having a focal point adjusted to a short distance [see the left side of the optical axis in FIG. 14(a)]. At this time, since, as shown, an outer surface of the flange section of the third lens 3 is engaged inside the outer frame member 23, the image pickup optical system 50 is guided in the direction of the optical axis O via the engaged section.

The image pickup device of the present invention will be described in further detail using FIGS. 15 to 20 that are perspective views of various members.

Figure 15:
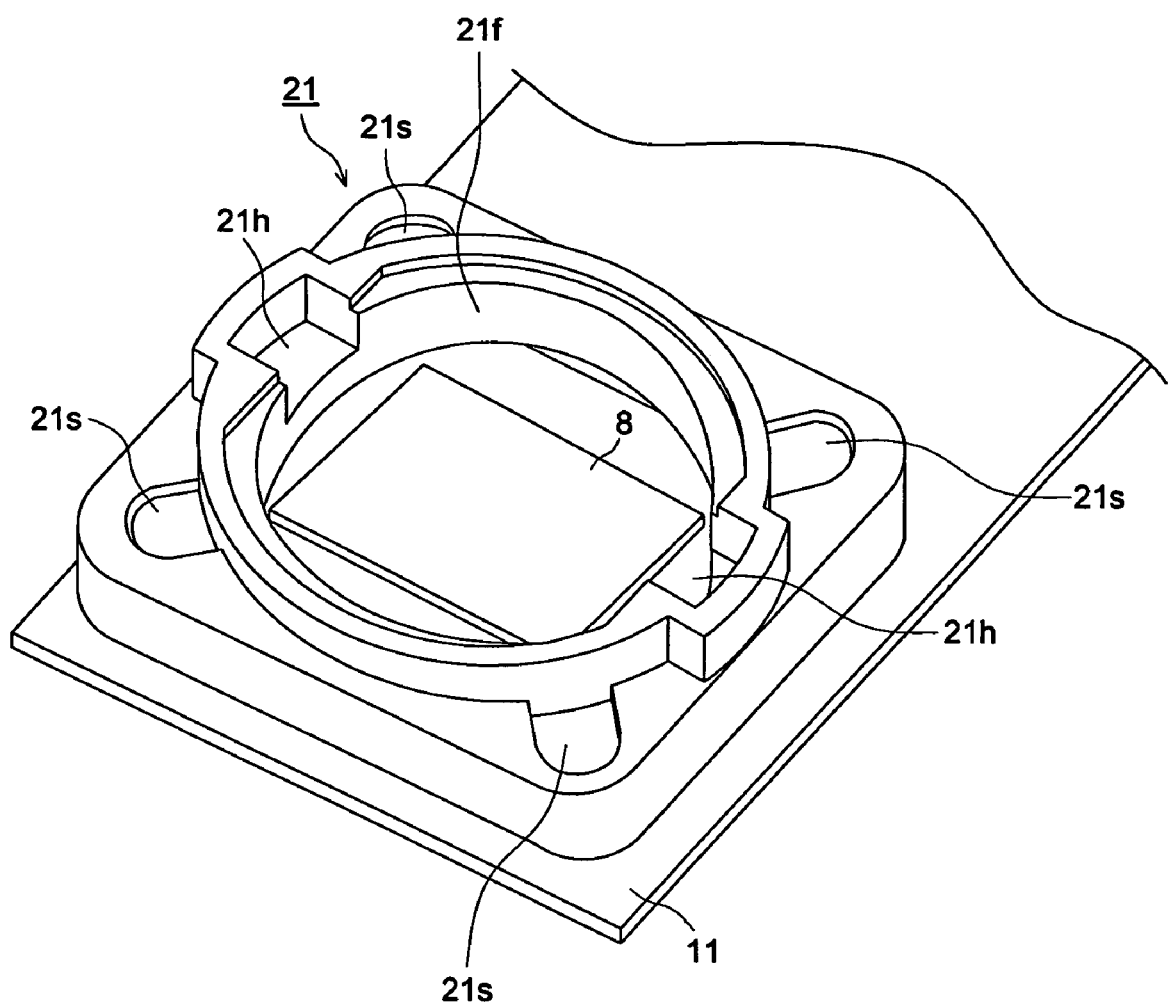
FIG. 15 is a perspective view of a base member.

FIG. 15 is a perspective view of the base member 21. This figure shows the base member 21 when it is mounted on the printed circuit board 11 having the image pickup element 8 mounted thereon.

The base member 21 is rested at a required position with respect to the image pickup element 8 after a position of the image pickup element 8 on the printed circuit board 11 has been confirmed using a TV camera equipped on a jig.

After that, the base member 21 has its entire outer peripheral section bonded onto and fixed to the printed circuit board 11 by use of, for example, an ultraviolet-curing type of adhesive.

As shown, the base member 21 is formed with two concave portions 21h and four adhesive sumps 21s. The two concave portions 21h are formed at symmetrical positions to increase flexibility of mounting of the base member 21 so that the base member 21 can be mounted even after being rotated through 180°.

Figure 16:
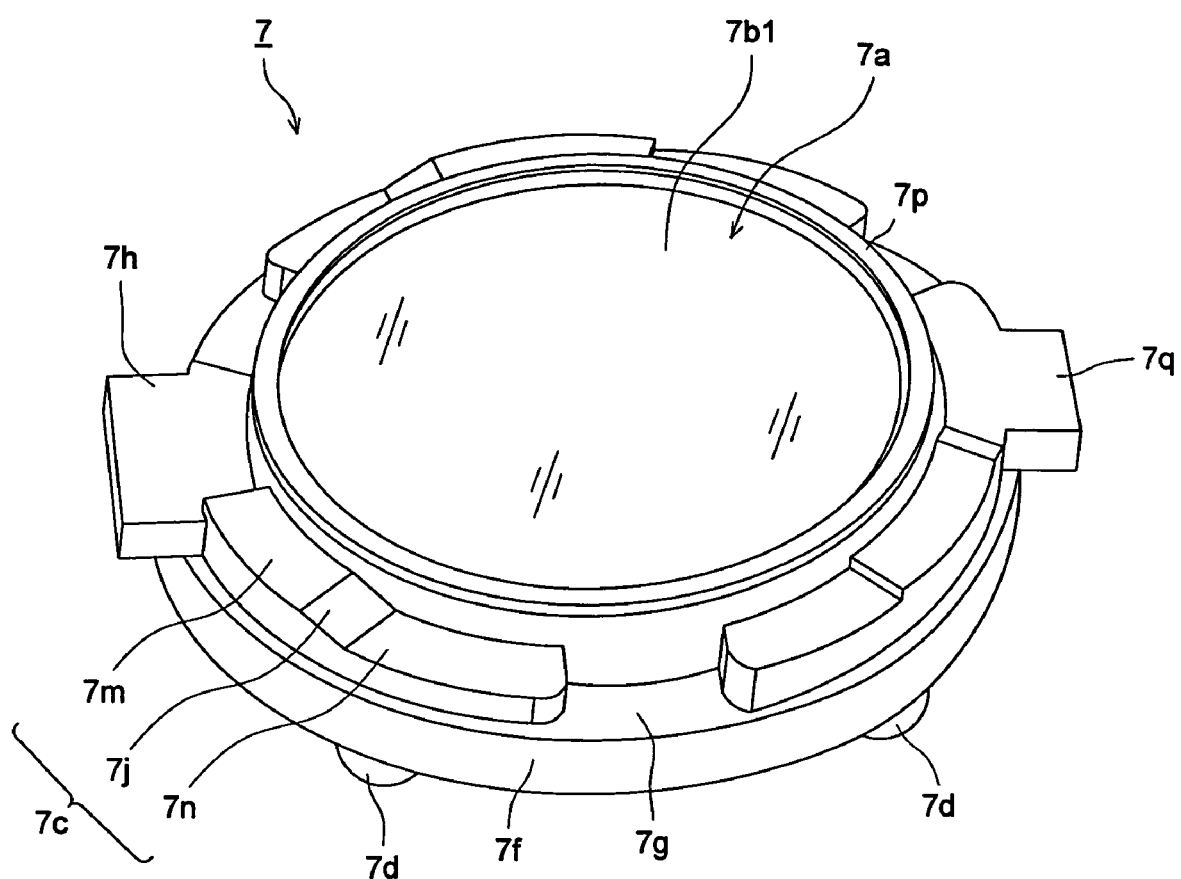
FIG. 16 is a perspective view of a cam member.

FIG. 16 is a perspective view of the cam member 7. This figure shows the cam member 8 when it is viewed from an obliquely upward direction of the object side. The cam member 7 has a light-transmitting section 7a formed of a light-transmissive material so as to cover an upper face of the image pickup element 8.

As shown in FIG. 16, the cam member 7 has a convex portion 7h on its outer surface, and the convex portion 7h is engaged with one of the two concave portions 21h of the base member 21, shown in FIG. 15. The convex portion 7h is thus positioned in a circumferential direction. A gate portion 7q formed at a position 180° shifted with respect to the convex portion 7h is smaller than the convex portion 7h in terms of both width and the amount of projection, and the gate portion 7q is fitted into the other concave portion 21h of the base member 21. A side face 7f of the outer surface is adapted to be assembled in engagement with the side face 21f on an inner surface of the base member 21, shown in FIG. 15.

The cam portion 7c is disposed periodically at intervals of approximately 120° in vicinity of the outer face of the cam member 7. Additionally, each of the cam portions 7c is formed up of horizontal planes 7m and 7n whose positions differ from each other in the direction of the optical axis, and an inclined plane 7j connecting the horizontal planes 7m and 7n.

Furthermore, a stepped section 7g lower than not only the horizontal planes 7m and 7n that constitute the cam surface, but also the inclined plane 7j connecting the horizontal planes 7m and 7n, is formed between the cam portions. The stepped section 7g is also formed between a side face of each cam portion 7c and the side face 7f of the outer surface, over a peripheral section of the cam member 7, except for the gate portion 7q.

Dropping the cam member 7 in this state into the base member 21 shown in FIG. 15 abuts the integrally formed leg section 7d of the cam member 7 on the image pickup element 8 of FIG. 15. Coating each stepped portion 7g, in this state, with, for example, an ultraviolet-curing type of adhesive, causes the cam member 7 to be bonded onto and fixed to the base member 21 shown in FIG. 15.

The above coating operation prevents the adhesive from seeping onto the horizontal planes 7m and 7n that constitute the cam surface of each cam portion 7c, and onto the inclined plane 7j connecting the horizontal planes 7m and 7n, and thus prevents the adhesive and foreign substances from sticking. The above coating operation also permits the adhesive to permeate a clearance between the side face 7f of the outer surface and the side face 21f of the inner surface of the base member 21 by a capillary action and thereby seal a space formed in the image pickup element 8. As a result, entry of moisture from outside into the space of the image pickup element 8 can be prevented.

Additionally, the light-transmitting section 7a formed so as to cover the upper face of the image pickup element 8 has the faces 7b1, 7b2, and of the two faces, only the face 7b1 at the incident side of object light is formed at a position higher than that of each cam portion 7c, that is, at a position closer to a position at the object side in the optical-axis direction, than to the horizontal plane 7m that is the higher of the two horizontal planes 7m, 7n. The face 7b1 at the incident side of object light is coated with, for example, a dielectric multiplayer film, to cut off infrared light and prevent the infrared light from reaching the image pickup element 8.

When the face 7b1 having at least its peripheral section formed at a position closer to the position (projecting position) at the object side in the optical-axis direction, than to the cam portion 7c, is provided with such infrared light cutoff coating, the face 7b1 to be coated can be easily exposed from a jig that holds the cam member inside the coating apparatus used. A uniform film can be formed on the face 7b1 as a result. In addition, it becomes possible to prevent the cam portion 7c from being coated and to prevent occurrence of dust due to wear or other factors. Furthermore, if the face to be provided with infrared light cutoff coating is disposed in a space at the imaging surface located at rear of the image pickup optical system 50, the image pickup device 400 can be thinned down since a thickness thereof will be suppressed.

Moreover, a frame section 7p slightly higher than the face 7b1 to be coated is desirably formed around the face 7b1. Thus, contact of the face 7b1 to be coated can be prevented, even when, for some reason, the face 7b1 is disposed at a lower position or facing downward. While the frame section 7p formed over a circumference is shown in this example, a plurality of protrusions or the like may be formed instead.

Also, as shown in FIG. 14(b), the face 7b1 to be coated may be formed into a concave face when viewed from the object light incident side. In general, for such an optical system as in the present invention, a distance to an exit pupil decreases and an exit angle increases at periphery. If such a concave face as mentioned above is formed, however, an angle of incidence of the object light emitted from a final face of the image pickup optical system 50, on the face 7b1 to be coated, can be reduced with respect to an inclination of a flux at periphery. Changes in spectral transmittance due to changes in the angle of incidence on the dielectric multiplayer film can also be suppressed. In addition, the cam member 8 may be molded using an infrared light-absorbing member, instead of infrared light cutoff coating.

Figure 17:
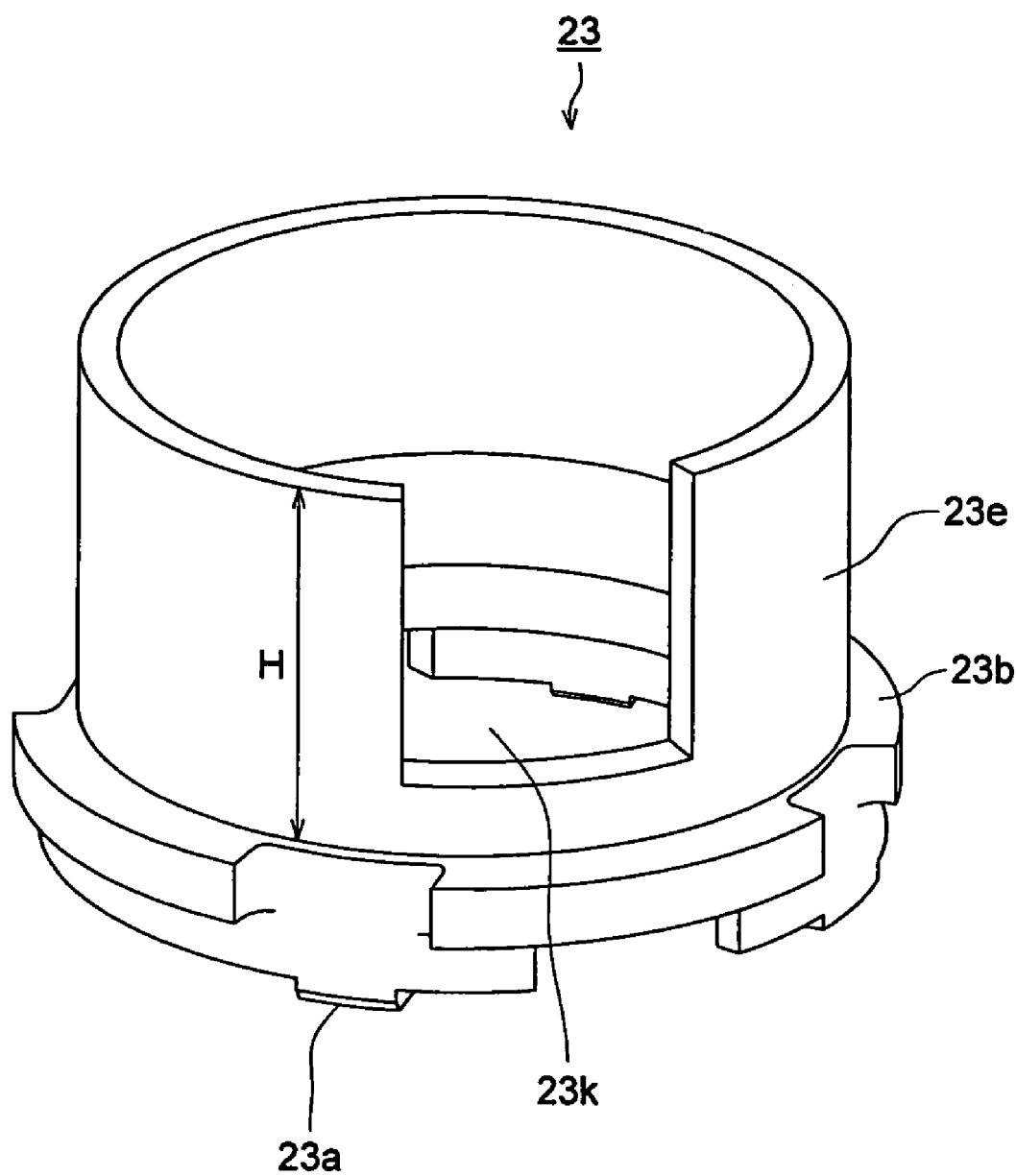
FIG. 17 is a perspective view of an outer frame member.
Figure 18:
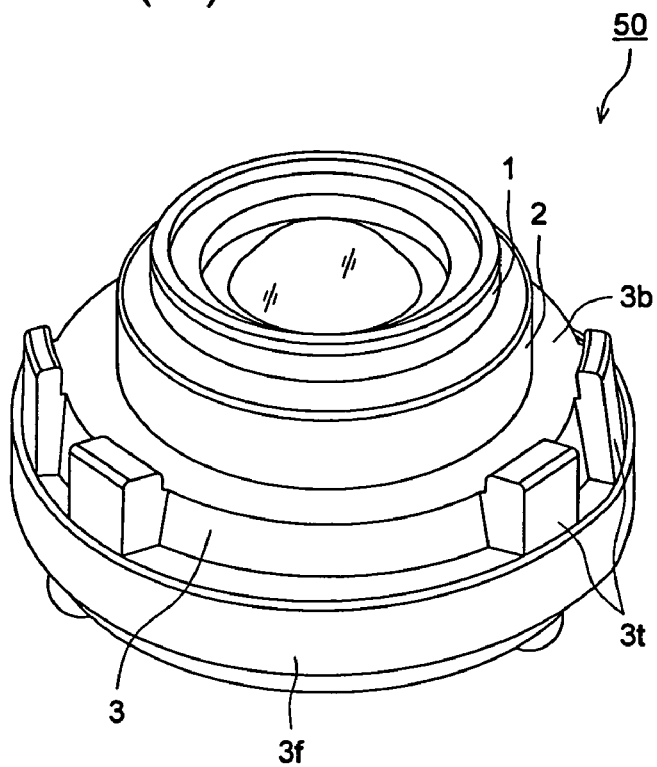
FIGS. 18(a) and 18(b) are perspective views of the image pickup optical system that has been integrated into a single unit.
Figure 18:
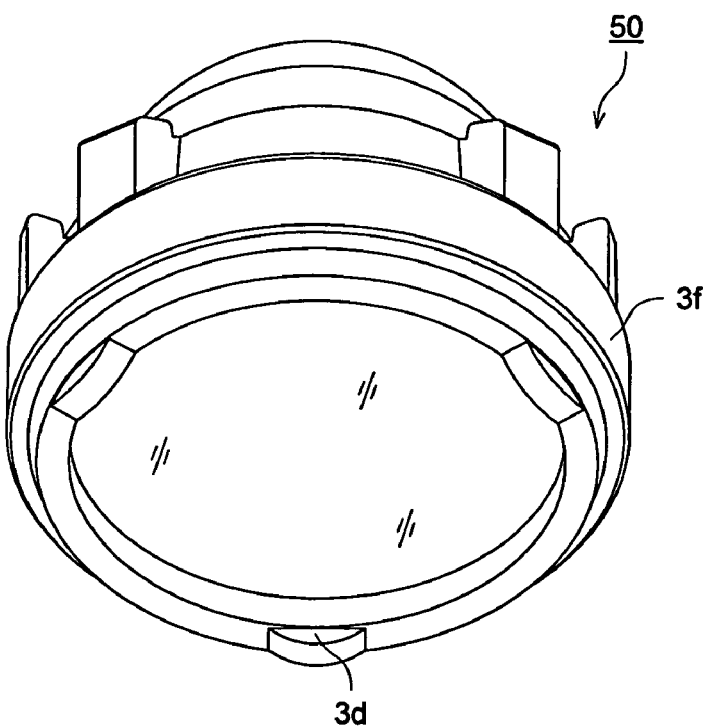

FIG. 17 is a perspective view of the outer frame member 23. The outer frame member 23 is assembled onto the base member 21 shown in FIG. 15, and a projection 23a is bonded and fixed in an engaged condition at an adhesive sump 21s.

As shown in FIG. 17, the outer frame member 23 is formed up of a cylindrical section 23e, an opening 23k formed in the cylindrical section 23e, and a rib 23b. The cylindrical section of the outer frame member 23 is formed so as to have an inside diameter reduced at the image pickup element side and increased at the object side [see the left side of the optical axis O in FIG. 14(a)]. That is because the image pickup optical system 50 is to be assembled from the object side.

FIGS. 18(a) and 18(b) are perspective views of the image pickup optical system 50 that has been integrated into a single unit. FIG. 18(a) is a view of the image pickup optical system 50 from an obliquely upward direction of the object side, and FIG. 18(b) is a view of the image pickup optical system 50 from an obliquely downward direction of the image pickup element side.

As shown in FIG. 18(a), the image pickup optical system 50 that includes a first lens 1, a second lens 2, a third lens 3, and diaphragms installed for each of the lenses, has three engagement sections 3t formed at intervals of approximately 120° on a flange section of the third lens 3. One of the three engagement sections 3t, and an engagement section 22t formed on the pivoting member 22 of FIGS. 14(a) and 14(b) are engaged to achieve pivoting.

In addition, the compression coil spring 9 shown as an energizing member in FIGS. 14(a) and 14(b) is mounted at a planar portion 3b of the flange section of the third lens 3. The three engagement sections 3t prevent the compression coil spring 9 from coming off. Also, an outer peripheral portion 3f of the flange section of the third lens 3 and an inner surface of the outer frame member 23 shown in FIGS. 14(a), 14(b), and 17, become engaged with each other, thus serving as a guide section for the image pickup optical system 50 to move in the direction of the optical axis. A depth of this engagement section 3t in the direction of the optical axis ensures a sufficient amount of engagement, even after the image pickup optical system 50 has moved in the direction of the optical axis. Forming at least one engagement section 3t just suffices.

As shown in FIG. 18(b), the third lens 3 in the image pickup optical system 50 has three protrusions 3d at positions associated with the cam portions 7c of the cam member 7 of FIG. 16, in a region other than the optically effective faces at the image pickup element side. The three protrusions 3d are adapted to abut on the cam portions 7c of the cam member 7 of FIG. 16. Thus, the image pickup optical system 50 either moves from the horizontal plane 7n via the inclined plane 7j to the horizontal plane 7m to thereby switch the focal point from a hyperfocal position to a macro-photographing position or moves from the horizontal plane 7m via the inclined plane 7j to the horizontal plane 7n to thereby return the focal point from the macro-photographing position to the hyperfocal position.

Each protrusion 3d is desirably formed as a part of such a cylindrical section as shown in FIG. 18(b), and forming the protrusion into this shape makes it possible to maintain sufficient strength against shocks and the like. The protrusion 3d may also be of such a shape that forms, for example, a part of a triangular prism with a round front end, or a part of a spherical section.

Figure 19:
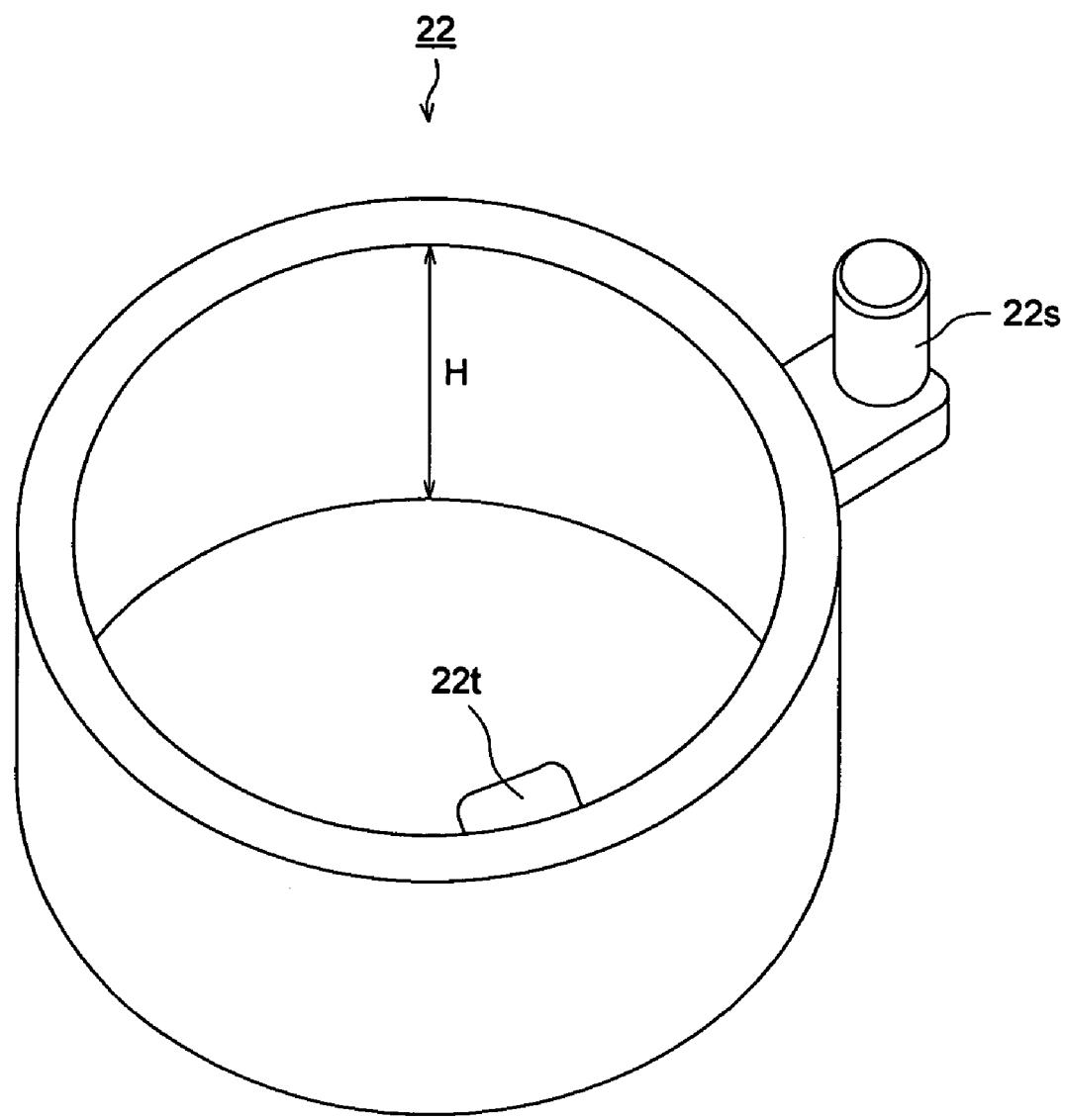
FIG. 19 is a perspective view of a pivoting member.

FIG. 19 is a perspective view of the pivoting member 22.

The pivoting member 22 is assembled into an outer surface of the cylindrical section 23e of the outer frame member 23 shown in FIG. 17, and the rib 23b functions as a support to receive the pivoting member. The engagement section 22t is positioned in a region of the opening 23k of the outer frame member 23 shown in FIG. 17, and the engagement section 22t is assembled so as to engage with one of the engagement sections 3t of the image pickup optical system 50, shown in FIGS. 18(a) and 18(b).

A cylindrical section of the pivoting member 22 is formed to have approximately the same length (denoted as H in FIG. 19) as a length (denoted as H in FIG. 17) of a section above the rib 23b of the outer frame member 23, shown in FIG. 17. The opening 23k in the outer frame member 23 can thus be shielded with the pivoting member 22 disposed on a side face of the outer frame member 23.

The position of the operating member 22s and that of the engagement section 22t differ from each other in a circumferential direction. Arranging the operating member 22s and the engagement section 22t in this way makes it possible to obtain an image pickup device 400 capable of being built into various hand-held terminals each of different layout with adapted position of the operating member 22s, just by providing the pivoting member 22.

Of course, the engagement section 22t formed on the pivoting member 22 is set so as not to allow the image pickup optical system 50 of FIGS. 18(a) and 18(b) to interfere with the engagement section 22t in the direction of the optical axis, even when the image pickup optical system 50 moves in this direction.

Figure 20:
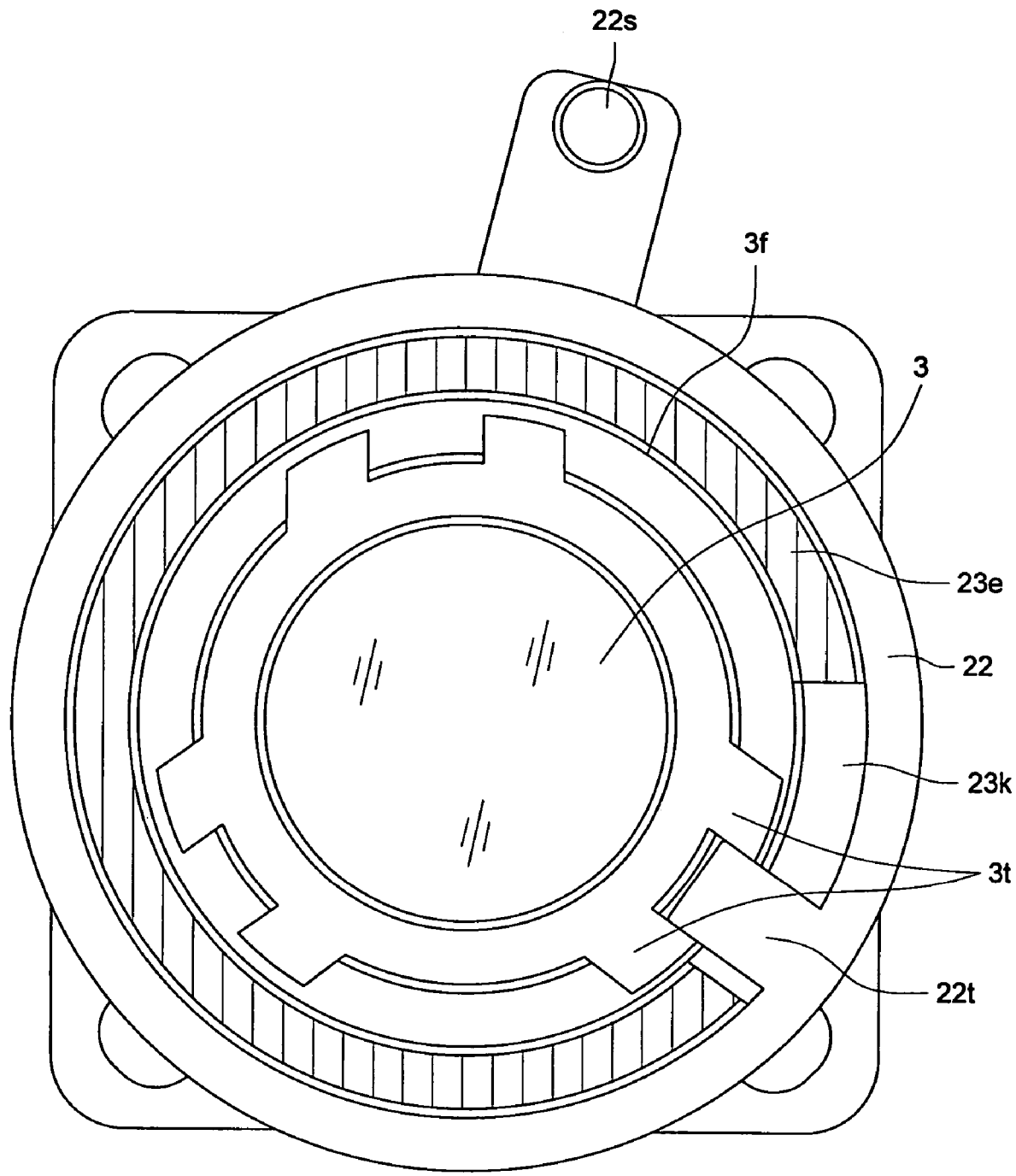
FIG. 20 is a sectional view showing the engagement relationship between a pivoting member and the third lens of an image pickup optical system, with an outer frame member sandwiched between both.

FIG. 20 is a sectional view showing an engagement relationship between the pivoting member 22 and the third lens 3 of the image pickup optical system 50, with the outer frame member 23 sandwiched between both.

As shown in FIG. 20, the third lens 3 and the pivoting member 22 are disposed internally and at an outer surface, respectively, with respect to the outer-frame member cylindrical section 23e sandwiched between the third lens 3 and the pivoting member 22. Also, the engagement section 22t of the pivoting member 22 projects above the opening 23k in the third lens 3 and engages with the engagement sections 3t thereof. This makes the pivoting member 22 and the third lens 3 movable together within a range of the opening 23k in such a form as to sandwich the cylindrical section 23e. That is to say, the image pickup optical system 50 is guided via the flange outer surface 3f of the third lens 3 and inside the cylindrical section 23e of the outer frame member, and the pivoting member 22 is supported outside the outer-frame member cylindrical section 23e.

The engagement sections 3t are desirably formed internally to the flange outer surface 3f. Doing so yields an advantage in that even at the same pivoting angle, the region of the opening 23k can be reduced.

As mentioned above, the pivoting member 22 disposed on the side face of the outer frame member 23 shields the opening 23k formed therein, and as shown in FIGS. 14(a) and 14(b), the cover member 13 is installed on the upper face of the outer frame member 23. As already described in FIG. 13, when built into a hand-held terminal, the image pickup device 400 is mounted in the cover member 13 in such a way as to be pressed against cover glass via a rubber O-ring or the like. It is therefore possible to obtain an image pickup device 400 capable of preventing entry of dust from outside into the image pickup device 400 after the device 400 has been built into the hand-held terminal, and thus preventing entry of dust and dirt into the image pickup device 400 while at the same time making the image pickup optical system 50 movable for macro-photographing.

Also, although the outer frame member 23 and the base member 21 may be integrally formed, separating both as described above makes adhesive-coating needles readily accessible to required positions, thus enabling reliable bonding and sealing.

Sixth Embodiment

A sixth embodiment will be described next. In the description of the sixth embodiment, the same functional components as those of the fifth embodiment are each assigned the same reference number or symbol, and description of these functional members is omitted, except for different sections.

Figure 21:
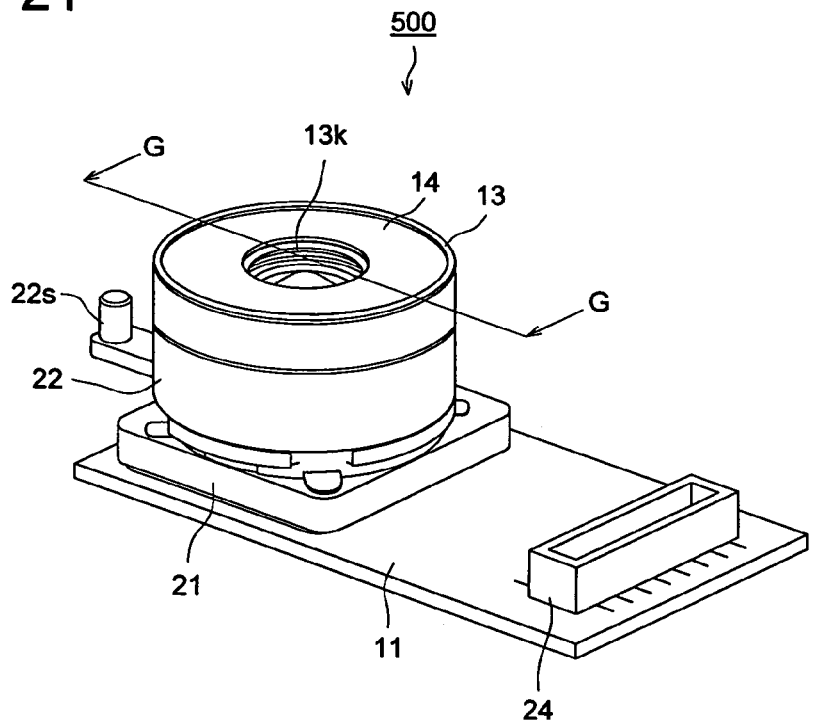
FIG. 21 is a perspective view of an image pickup device 500 according to the present invention.

FIG. 21 is a perspective view of an image pickup device 500 according to the present invention. The image pickup device 500 is built into the position of the image pickup device S shown in FIG. 1.

As shown in FIG. 21, the image pickup device 500 has an outer surface different from that of the image pickup device 400 of FIG. 13 in terms of a position at which a pivoting member 22 and a cover member 13 are to abut on each other, that is, the outer surface of the image pickup device 500 is located at a position closer to a circuit board. Other aspects of the outer surface are essentially the same as for the image pickup device 400.

Figure 22:
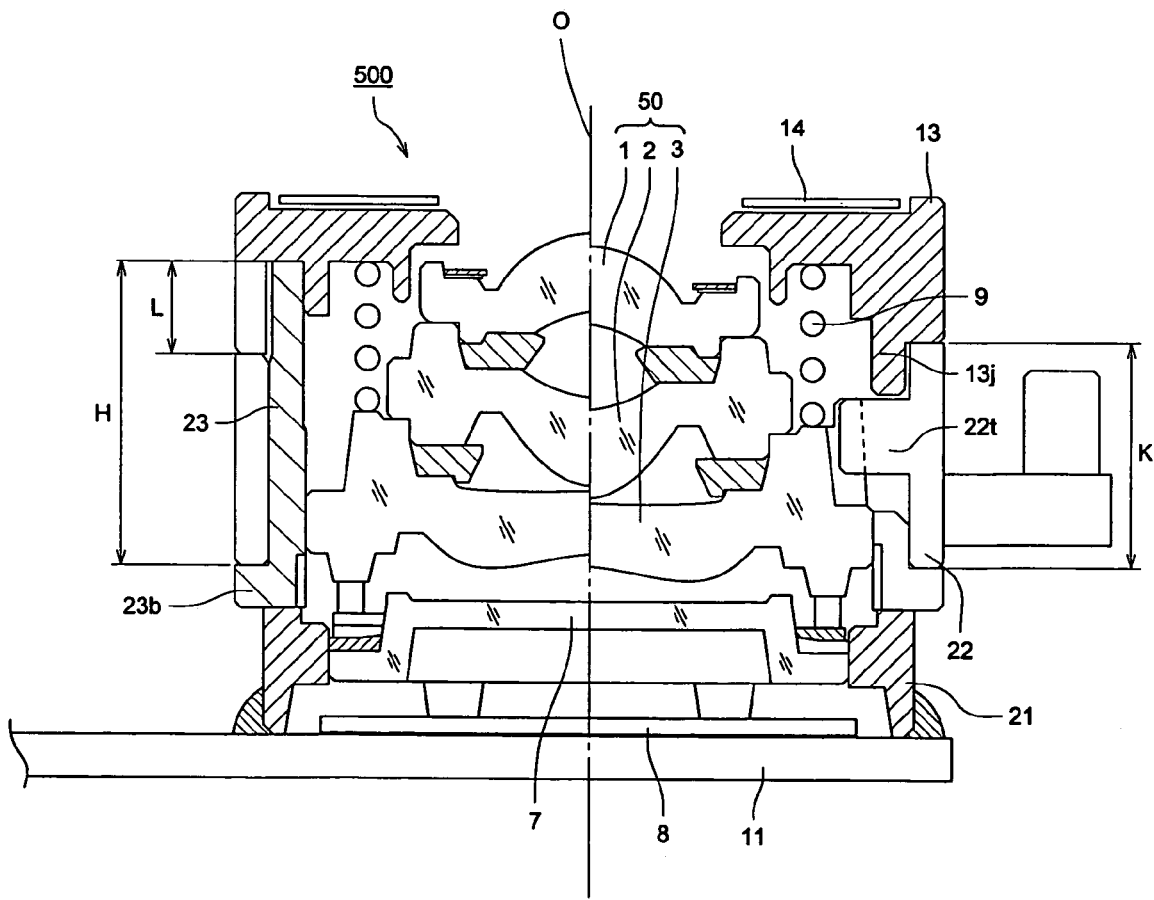
FIG. 22 is a schematic sectional view showing an internal structure of the image pickup device 500 of the present invention.

FIG. 22 is a schematic sectional view showing an internal structure of the image pickup device 500 of the present invention. This figure shows the internal structure in sectional view taken along line G-G of FIG. 21. More specifically, the right side of an optical axis O of an image pickup optical system shows a state in which a focal point thereof is adjusted to a hyperfocal distance, and the left side shows the macro-photographing state established when the focal point of the image pickup optical system is moved through a required distance towards a photographic object and adjusted to a short distance.

The image pickup device 500 shown in FIG. 22 includes: an image pickup optical system 50 constituted by a first lens 1, a second lens 2, a third lens 3, and diaphragms installed for each of the lenses; a cam member 7; an image pickup element 8 mounted on a printed circuit board 11; a compression coil spring 9 as an energizing member; a base member 21; a decorative plate 14; and an outer frame member 23. In terms of shape, operation, and other factors, the above components of the image pickup device 500 are substantially the same as those already described in the first embodiment.

As shown in FIG. 22, in the image pickup device 500, a cylindrical section of the pivoting member 22 is formed with length K smaller than length H of a section above a rib 23b of the outer frame member 23. Also, a cover member 13 has an overhang of length L so as to cover the outer frame member 23 in a cylindrical direction, and thus an opening 23k (see FIG. 17) in the outer frame member 23 is shielded with the pivoting member 22 and the cover member 13.

The cover member also has a tongue portion 13j so as to project internally to the cylindrical section of the pivoting member 22.

Constructing each constituent element in this way makes it possible to form a section that double-shields the opening 23k in the outer frame member 23, at the tongue portion 13j of the cover member 13 and at the cylindrical section of the pivoting member 22. Entry of dust from outside can thus be prevented more reliably.

As described above, the pivoting member 22 on a side face of the outer frame member 23, and the cover member 13 disposed on an upper face of the outer frame member 23 shield the opening 23k formed therein. Also, as already described in FIG. 13, when built into a hand-held terminal, the image pickup device 500 is mounted in the cover member 13 in such a way as to be pressed against cover glass via a rubber O-ring or the like. It is therefore possible to obtain an image pickup device 500 capable of preventing entry of dust from outside into the image pickup device 500 after the device has been built into the hand-held terminal, and thus preventing entry of dust and dirt into the image pickup device 500 while at the same time making the image pickup optical system 50 movable for macro-photographing.

It goes without saying that the tongue portion on the cover member, described in the sixth embodiment, is also applicable to the foregoing fifth embodiment.

Seventh Embodiment

Next, assembly of an image pickup device according to the present invention will be described.

Figure 23:
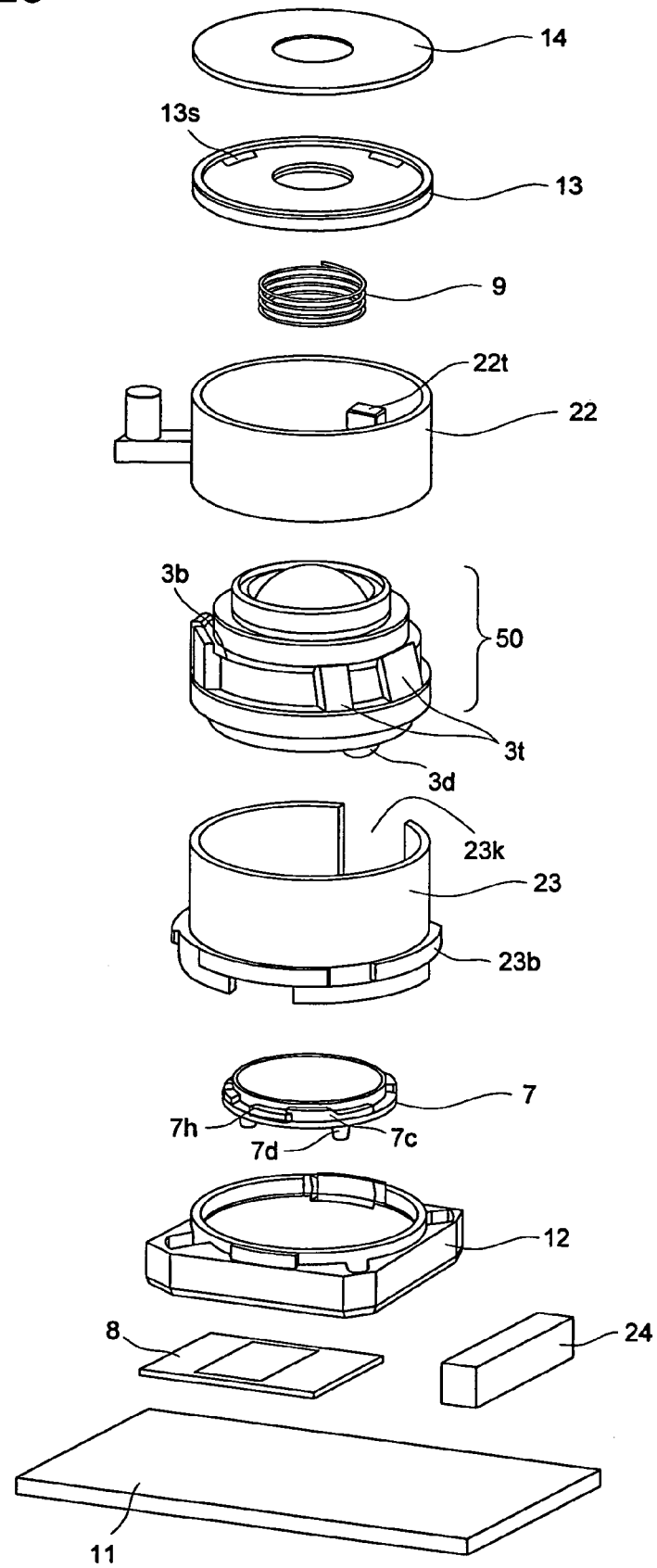
FIG. 23 is a diagram showing an example of the direction and order of assembling an image pickup device 500 according to the present invention.

FIG. 23 is a diagram showing an example of a direction and order of assembling an image pickup device according to the present invention. The image pickup device 400 of the foregoing fifth embodiment and the image pickup device 500 of the sixth embodiment are the same in terms of the direction and order of assembly, so the following description per FIG. 23 uses the reference numbers or symbols assigned to each member of the image pickup device 400:

(1) After the connector 17 and other electrical components not shown have been mounted on the printed circuit board 11 that functions as an assembling base, the image pickup element 8 is mounted as the final component mounted on the board 11. Mounting in this order minimizes a thermal load on the image pickup element 8 that has a microlens array and/or the like formed thereon.

(2) After a position of the image pickup element 8 on the printed circuit board 11 has been confirmed using a TV camera equipped on a jig, the base member 21 is rested at a required position with respect to the image pickup element 8 and has an entire outer peripheral section bonded onto and fixed to the printed circuit board 11 by use of, for example, an ultraviolet-curing type of adhesive.

(3) With the cam member 7 remaining engaged with the inner surface of the base member 7, the convex portion 7h is engaged with and rested in a concave portion of the base member. Thus, the leg section 7d integrally formed on the cam member 7 abuts on the image pickup element 8. In this state, coating the stepped portion 7g with, for example, an ultraviolet-curing type of adhesive, not only causes the cam member 7 to be bonded onto and fixed to the base member 21, but also causes a space within the image pickup device 8 to be sealed, as shown in FIG. 16.

(4) The outer frame member 23 is rested on the base member 21 and then fixed thereto by bonding.

(5) The image pickup optical system 50 is rested on the inner surface of the cylindrical section of the outer frame member 23 so that the three engagement sections 3t fit into position. Thus, the protrusions 3d abut at required positions on the cam portions 7c of the cam member 7.

(6) The pivoting member 22 is rested on and lowered onto the outer surface of the cylindrical section of the outer frame member 23, and the rib 23b receives and supports the pivoting member 22. The engagement section 22t is positioned in a region of the opening 23k of the outer frame member 23 and then assembled so as to engage with one of the engagement sections 3t of the image pickup optical system 50.

(7) The energizing member 9 is rested on the face 3b of the image pickup optical system 50.

(8) The cover member 13 is rested on the outer frame member 23 and then fixed thereto by bonding at three holes 13s.

(9) The decorative plate 14 is rested on the cover member 13 and then fixed thereto by bonding. The fixing uses an adhesive or a double-side adhesive tape.

As described above, it becomes possible to manufacture an image pickup device just by resting the base member, the cam member, the outer frame member, the image pickup optical system, and the pivoting member, on the printed circuit board from the same direction, and thus to automate assembly. An image pickup device low in cost and flexibly responsive to changes in demand can thus be obtained.

Figure 24:
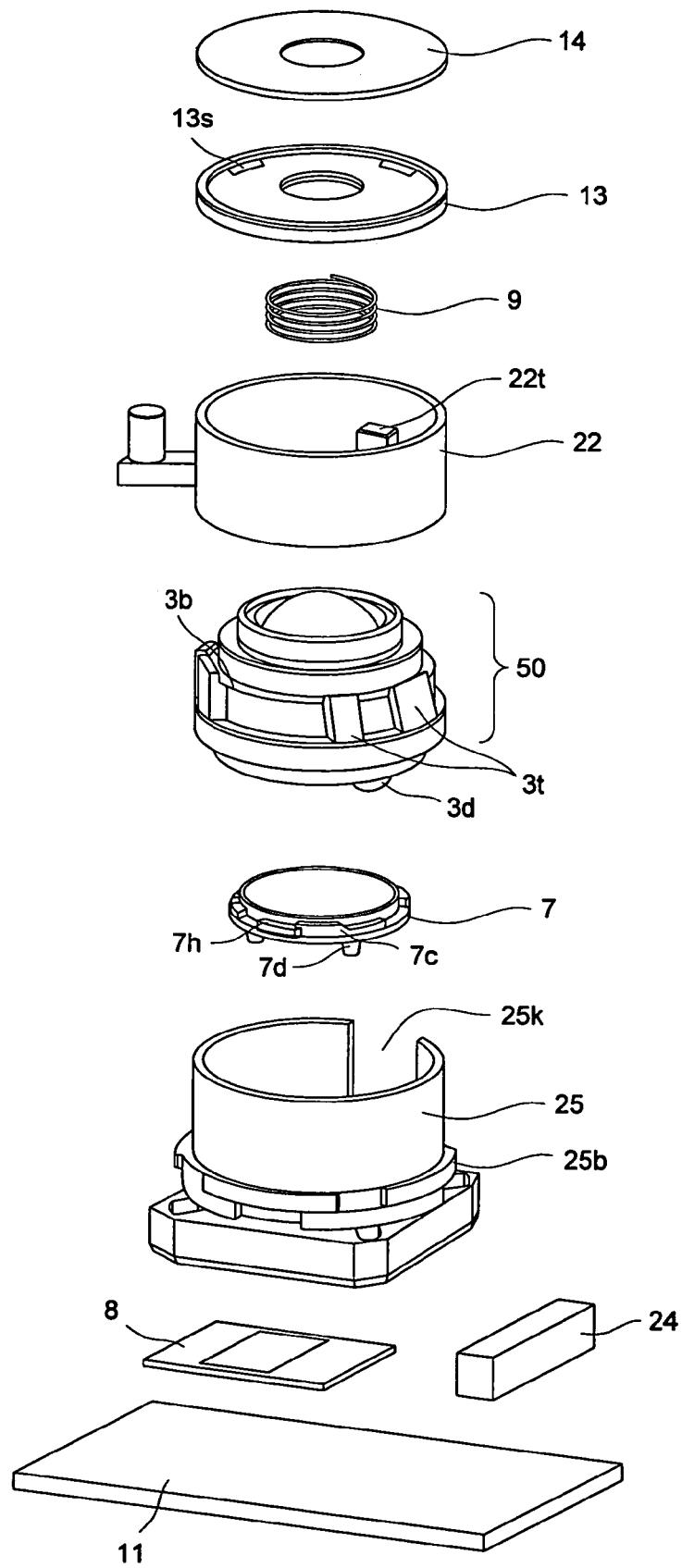
FIG. 24 is a diagram showing another example of the direction and order of assembling an image pickup device 500 according to the present invention.

FIG. 24 is a diagram showing another example of a direction and order of assembling an image pickup device according to the present invention. This diagram shows an example of using a main barrel 18 integrally formed up of the base member 21 and outer frame member 23 shown in FIG. 23. The following description is based on FIG. 24:

(1) As in FIG. 23, after the connector 17 and other electrical components not shown have been mounted on the printed circuit board 11 that functions as an assembling base, the image pickup element 8 is mounted as the final component mounted on the board 11.

(2) After a position of the image pickup element 8 on the printed circuit board 11 has been confirmed using a TV camera equipped on a jig, the main barrel 18 is rested at a required position with respect to the image pickup element 8 and has an entire outer peripheral section bonded onto and fixed to the printed circuit board 11 by use of, for example, an ultraviolet-curing type of adhesive.

(3) The cam member 7 is engaged with an interior of the main barrel and rested at that position. Thus, the leg section 7d integrally formed on the cam member 7 abuts on the image pickup element 8. In this state, coating the stepped portion 7g with, for example, an ultraviolet-curing type of adhesive, not only causes the cam member 7 to be bonded onto and fixed to the base member 21, but also causes a space within the image pickup device 8 to be sealed, as shown in FIG. 16.

(4) The image pickup optical system 50 is rested on an inner surface of a cylindrical section of the main barrel 18 so that the three engagement sections 3t fit into position. Thus, the protrusions 3d abut at required positions on the cam portions 7c of the cam member 7.

(5) The pivoting-member 22 is rested on and lowered onto an outer surface of the cylindrical section of the main barrel 18, and a rib 18b receives and supports the pivoting member 22. The engagement section 22t is positioned in a region of an opening 23k of the main barrel 18 and then assembled so as to engage with one of the engagement sections 3t of the image pickup optical system 50.

(6) The energizing member 9 is rested on the face 3b of the image pickup optical system 50.

(7) The cover member 13 is rested on the main barrel 18 and then fixed thereto by bonding at three holes 13s.

(8) The decorative plate 14 is rested on the cover member 13 and then fixed thereto by bonding. The fixing uses an adhesive or a double-side adhesive tape.

When the main barrel 18 integrally formed up of the base member 21 and outer frame member 23 shown in FIG. 23 is used in this manner, it also becomes possible to manufacture an image pickup device just by resting the main barrel, the cam member, the outer frame member, the image pickup optical system, and the pivoting member, on the printed circuit board from the same direction, and thus to automate assembly. Thus, an image pickup device low in cost and flexibly responsive to changes in demand can likewise be obtained.

INDUSTRIAL APPLICABILITY

As describe above, it became possible to obtain an image pickup device that can prevent the dust entering from outside and the dust occurring during internal operation, from sticking to an image pickup element, and thus protect image data from trouble; and a hand-held terminal having this image pickup device.

It is possible to obtain an image pickup device that includes: an image pickup element; an image pickup optical system; a cam member that has a cam surface abutting on an abutting section formed on a section other than an optically effective face of the image pickup optical system; and a base member that holds the cam member. In this image pickup device, the cam member further has a stepped section lower than the cam surface and is bonded to the base member via an adhesive applied to the stepped section. Thus, it is possible to obtain an image pickup device that prevents the adhesive from seeping onto the cam surface formed on the cam member, thus preventing the adhesive and foreign matter from sticking, and consequently, does not affect image pickup optical system operation.

It is also possible to obtain an image pickup device in which, since the cam member is engaged with the base member, on an outer peripheral side face of the cam member, the adhesive can permeate a clearance between the outer peripheral side face and a side face of an inner surface of the base member by a capillary action and thereby seal a space formed in the image pickup element, and consequently prevent entry of moisture from outside into the space of the image pickup element.

In addition, since a cam surface is formed in a plurality of places on the cam member and since a stepped section is also formed in a region between cam surfaces, wide areas can be obtained at adhesive-injecting positions and bonding can thus be easily conducted.

Furthermore, the cam member has a leg section abutting on the image pickup element, the leg section is bonded to the base member in an abutting state of the leg section with respect to the image pickup element, and the image pickup optical system is energized in a direction of the image pickup element by an energizing member to thereby abut on the cam surface(s) of the cam member, at the abutting section. For these reasons, the number of components to be interposed as components involved with image pickup optical system positioning in a direction of the optical axis can be minimized for reduced costs, and in addition, after-assembly focal point positioning accuracy can be improved.

Moreover, constructing a hand-held terminal having the above image pickup device makes it possible to obtain a hand-held terminal capable of achieving accurate operation of the image pickup optical system, preventing entry of moisture into the image pickup element disposed inside the image pickup optical system, and conducting macro-photographing.

According to the present invention, it is possible to obtain a thinned-down image pickup device including: an image pickup element; an image pickup optical system; and a cam member having a cam surface which abuts on an abutting section formed at a section other than an optically effective face of the image pickup optical system.

In this image pickup device, the cam member further has a light-transmitting section formed of a light-transmissive material, the same side face as the face on which the cam surface of the light-transmitting section is formed is formed so that at least a peripheral section of that side face is positioned so as to project from/above the cam surface, and this face is coated to cut off infrared light. Thus, it becomes possible to confer an integrated infrared light cutoff function on the cam member located at rear of the image pickup optical system, and obtain the image pickup device reduced in thickness. Additionally, when a photographic object light incident face of the light-transmitting section is formed at a position higher than the cam surface, the face to be coated will easily become exposed from a jig that holds the cam member inside the coating apparatus used. A uniform film can be formed on that face as a result. Furthermore, it becomes possible to prevent the cam portion from being coated and to prevent occurrence of dust due to wear or other factors.

Moreover, the light-transmitting section is formed on the cam member so as to cover the photoelectric conversion side of the image pickup element, the cam member has a leg section that abuts on the image pickup element, the leg section is fixed in an abutting condition with respect to the image pickup element, and the image pickup optical system is energized in a direction of the image pickup element and thus abuts on the cam surface of the cam member, at that abutting section. For these reasons, the number of components to be interposed as components involved with image pickup optical system positioning in a direction of the optical axis can be minimized for reduced costs, and in addition, after-assembly focal point positioning accuracy can be improved.

Besides, since the face to coated to cut off infrared light is the photographic object light incident face of the light-transmitting section and since this face is formed into a concave shape, an angle of incidence of the object light emitted from a final face of the image pickup optical system, on the face to be coated, can be reduced with respect to an inclination of a flux at periphery. Changes in spectral transmittance due to changes in the angle of incidence on a dielectric multiplayer film can also be suppressed.

Besides, constructing a hand-held terminal that has the above image pickup device enables the hand-held terminal to be reduced in thickness and a macro-photographing function to be assigned to this terminal.

According to the present invention, it is also possible to obtain an image pickup device constructed so that an image pickup optical system, a cam member having a cam surface which abuts on an abutting section formed at a section other than an optically effective face of the image pickup optical system, a base member that holds the cam member, an outer frame member that contains at least the image pickup optical system, and a pivoting member pivotally disposed on an outside face of the outer frame member and having an integrally formed engagement section that engages with the image pickup optical system, are rested and mounted, from the same direction, on a printed circuit board which has an image pickup element mounted thereon. Because of the above construction, this image pickup device permits automated assembly, and this, in turn, makes it possible to obtain an image pickup device low in cost, flexibly responsive to changes in demand, and capable of macro-photographing.

In addition, it is possible to provide a method of manufacturing an image pickup device which includes: a printed circuit board with an image pickup element mounted thereon; an image pickup optical system; a cam member having a cam surface which abuts on an abutting section formed on a section other than an optically effective face of the image pickup optical system, wherein the cam member also has a leg section which abuts on the image pickup element; a base member that holds the cam member; an outer frame member containing at least the image pickup optical system; and a pivoting member pivotally disposed on an outside face of the outer frame member and having an integrally formed engagement section which engages with the image pickup optical system. This image pickup device manufacturing method includes the steps of: fixedly resting the base member at a required position on the printed circuit board; fixing the cam member to the base member by lowering the cam member thereinto with the leg section abutting on the image pickup element; fixing the outer frame member to the base member; mounting the image pickup optical system internally with respect to the outer frame member; and bringing the engagement section into engagement with the image pickup optical system by mounting the pivoting member on an outside face of the outer frame member. Thus, various components can be assembled from the same direction, the assembly can be automated, and thus an image pickup device low in cost and capable of macro-photographing can be manufactured.

Furthermore, it is possible to provide another method of manufacturing an image pickup device constructed so that an image pickup optical system, a cam member having a cam surface which abuts on an abutting section formed at a section other than an optically effective face of the image pickup optical system, a main barrel that contains at least the cam member and the image pickup optical system, and a pivoting member pivotally disposed on an outside face of the main barrel and having an integrally formed engagement section which engages with the image pickup optical system, are rested and mounted, from the same direction, on a printed circuit board which has an image pickup element mounted thereon. Because of the above construction, this image pickup device permits automated assembly. Automated assembly, in turn, makes it possible to obtain an image pickup device low in cost, flexibly responsive to changes in demand, and capable of macro-photographing.

Moreover, it is possible to provide a method of manufacturing an image pickup device which includes: a printed circuit board with an image pickup element mounted thereon; an image pickup optical system; a cam member having a cam surface which abuts on an abutting section formed on a section other than an optically effective face of the image pickup optical system, wherein the cam member also has a leg section which abuts on the image pickup element; a main barrel that contains at least the cam member and the image pickup optical system; and a pivoting member pivotally disposed on an outside face of the main barrel and having an integrally formed engagement section that engages with the image pickup optical system. This image pickup device manufacturing method includes the steps of: fixedly resting the main barrel to a required position on the printed circuit board; fixing the cam member to the main barrel by lowering the cam member thereinto with the leg section abutting on the image pickup element; mounting the image pickup optical system internally with respect to the main barrel; and bringing the engagement section into engagement with the image pickup optical system by mounting the pivoting member on an outside face of the main barrel. Thus, various components can be assembled from the same direction, the assembly can be automated, and thus an image pickup device low in cost and capable of macro-photographing can be manufactured.

The invention claimed is:

1. An image pickup device, comprising:
   an image pickup element;
   a mounting base formed with a leg section which abuts the image pickup element;
   an image pickup optical system that guides photographic object light to an image pickup region of the image pickup element;
   an outer frame member that encloses the mounting base and the image pickup element; and
   an energizing member that energizes the image pickup optical system in a direction of the mounting base;
   wherein a space formed at a photoelectric conversion plane side of the image pickup element is sealed by the mounting base or by the mounting base and a part of the outer frame member; and
   wherein the mounting base includes a cam surface, along which the image pickup optical system pivots to move along an optical axis in defiance of an energizing force of the energizing member.

2. The image pickup device according to claim 1, wherein:
   with the leg section abutted on the image pickup element, a to-be-bonded section of the mounting base that is present at a position different from the leg section, and either a circuit board with the image pickup element mounted thereon, or the outer frame member, are bonded to seal the space formed at the photoelectric conversion plane side of the image pickup element.

3. The image pickup device according to claim 1, wherein:
   the mounting base includes horizontal planes for abutting, each of the horizontal planes being formed with a different height; and
   one of the horizontal planes is selected to mount the image pickup optical system.

4. The image pickup device according to claim 1, wherein a part of an optical member which constitutes the image pickup optical system is formed at an image pickup light flux transmitting section of the mounting base.

5. The image pickup device according to claim 1, further having an infrared light cutoff filter formed on the mounting base.

6. The image pickup device according to claim 1, wherein the image pickup optical system includes a plurality of optical members, the optical members being in an abutting condition with respect to one another.

7. A hand-held terminal having the image pickup device according to claim 1.

8. The image pickup device according to claim 1, wherein the space formed at the photoelectric conversion plane side of the image pickup element is sealed by the mounting base.

* * * * *

UNITED STATES PATENT AND TRADEMARK OFFICE
CERTIFICATE OF CORRECTION

PATENT NO.       : 7,656,452 B2                                            Page 1 of 1
APPLICATION NO.  : 10/562530
DATED            : February 2, 2010
INVENTOR(S)      : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Twenty-eighth Day of December, 2010

David J. Kappos
*Director of the United States Patent and Trademark Office*